United States Patent
Choo et al.

(10) Patent No.: US 11,037,581 B2
(45) Date of Patent: Jun. 15, 2021

(54) SIGNAL PROCESSING METHOD AND DEVICE ADAPTIVE TO NOISE ENVIRONMENT AND TERMINAL DEVICE EMPLOYING SAME

(71) Applicant: SAMSUNG ELECTRONICS CO., LTD., Suwon-si (KR)

(72) Inventors: Ki-hyun Choo, Seoul (KR); Holly Francois, Surrey (GB); Eun-mi Oh, Seoul (KR); Chang-yeong Kim, Seoul (KR); Ho-sang Sung, Seoul (KR); Kyung-hun Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 16/312,827

(22) PCT Filed: Jun. 26, 2017

(86) PCT No.: PCT/KR2017/006728
§ 371 (c)(1),
(2) Date: Dec. 21, 2018

(87) PCT Pub. No.: WO2017/222356
PCT Pub. Date: Dec. 28, 2017

(65) Prior Publication Data
US 2019/0348058 A1 Nov. 14, 2019

(30) Foreign Application Priority Data
Jun. 24, 2016 (KR) .................. 10-2016-0079692

(51) Int. Cl.
*G10L 21/00* (2013.01)
*G10L 21/0232* (2013.01)
(Continued)

(52) U.S. Cl.
CPC .......... *G10L 21/0232* (2013.01); *G10L 15/20* (2013.01); *G10L 21/0364* (2013.01)

(58) Field of Classification Search
None
See application file for complete search history.

(56) References Cited

U.S. PATENT DOCUMENTS 5,678,221 A * 10/1997 Cahill .................. H04B 1/1027
455/200.1
7,050,966 B2 5/2006 Schneider et al.
(Continued)

FOREIGN PATENT DOCUMENTS

JP 2004-235737 A 8/2004
JP 4260046 B2 4/2009
(Continued)

OTHER PUBLICATIONS

International Search Report (PCT/ISA/210) dated Oct. 25, 2017 issued by the International Searching Authority in International Application No. PCT/KR2017/006728.
(Continued)

*Primary Examiner* — Edgar X Guerra-Erazo
(74) *Attorney, Agent, or Firm* — Sughrue Mion, PLLC

(57) ABSTRACT

Provided is a method for processing a signal adaptively to a noisy environment, the method including: determining a class related to enhancement of intelligibility, based on a noise spectrum of a reception side or a near-end device and a received voice spectrum; generating guide information for the enhancement of intelligibility based on the noise spectrum, the voice spectrum, and the determined class; and generating a changed voice spectrum by applying the guide information to the voice spectrum.

15 Claims, 17 Drawing Sheets

(51) Int. Cl.
  *G10L 15/20* (2006.01)
  *G10L 21/0364* (2013.01)

(56) References Cited

U.S. PATENT DOCUMENTS

| | | | |
|---|---|---|---|
| 7,747,028 | B2 | 6/2010 | Saito et al. |
| 8,180,064 | B1 | 5/2012 | Avendano et al. |
| 8,538,748 | B2 | 9/2013 | Lee et al. |
| 8,744,091 | B2 | 6/2014 | Chen et al. |
| 9,117,455 | B2 * | 8/2015 | Tracey .................. G10L 21/003 |
| 9,130,526 | B2 | 9/2015 | Sudo et al. |
| 10,636,433 | B2 * | 4/2020 | Stylianou ................ G10L 25/18 |
| 10,672,414 | B2 * | 6/2020 | Tashev .................. G06N 3/0454 |
| 2009/0089049 | A1 | 4/2009 | Moon et al. |
| 2009/0281803 | A1 | 11/2009 | Chen et al. |
| 2013/0151260 | A1 | 6/2013 | Francois |
| 2014/0064507 | A1 | 3/2014 | Su et al. |
| 2014/0365212 | A1 | 12/2014 | Konchitsky |
| 2015/0019212 | A1 | 1/2015 | Nongpiur |
| 2019/0318733 | A1 * | 10/2019 | Mani .................. G10L 21/0208 |
| 2019/0318755 | A1 * | 10/2019 | Tashev .................... G06N 3/08 |
| 2020/0243102 | A1 * | 7/2020 | Schmidt ................ G10L 19/005 |

FOREIGN PATENT DOCUMENTS

| | | |
|---|---|---|
| JP | 4460256 B2 | 5/2010 |
| JP | 2012-163682 A | 8/2012 |
| JP | 5443547 B2 | 3/2014 |
| KR | 10-2009-0009560 A | 1/2009 |
| KR | 10-0910384 B1 | 8/2009 |
| KR | 10-2010-0136629 A | 12/2010 |
| KR | 10-2011-0063001 A | 6/2011 |
| KR | 10-2012-0091701 A | 8/2012 |
| KR | 10-1435411 B1 | 8/2014 |
| WO | 2010/091399 A1 | 8/2010 |

OTHER PUBLICATIONS

Written Opinion (PCT/ISA/237) dated Oct. 25, 2017 issued by the International Searching Authority in International Application No. PCT/KR2017/006728.

Lee, S., and Jung, H., "Speech intelligibility enhancement based on the background noise analysis", Feb. 2006, p. 816-819, 4 pages total.

Kim, S., and Jee, S., "A study on adaptive noise cancellation for enhancement of digital speech articulation", Dec. 20, 2006, 8 pages total.

Yoon et al., "Improvement of Speech Intelligibility in Noisy Environments", 2009, p. 70-76, 7 pages total.

Kim, G., "Binary Mask Estimation using Training-based SNR Estimation for Improving Speech Intelligibility", Nov. 6, 2012, JBE vol. 17, No. 6, 8 pages total.

Kim, G., "A Post-processing for Binary Mask Estimation Toward Improving Speech Intelligibility in Noise", Mar. 2013, JBE vol. 18, No. 2, 8 pages total.

Petkov, P. and Kleijn, W., "Spectral Dynamics Recovery for Enhanced Speech Intelligibility in Noise", IEEE/ACM Transactions on Audio, Speech, and Language Processing, vol. 23, No. 2, Feb. 2015, 12 pages total.

"Universal Mobile Telecommunications System (UMTS); LTE; Codec for Enhanced Voice Services (EVS); General overview (3GPP TS 26.441 version 12.1.0 Release 12)" Jan. 2015, ETSI TS 126 441, 14 pages total.

"Universal Mobile Telecommunications System (UMTS); LTE; Codec for Enhanced Voice Services (EVS); Jitter buffer management (3GPP TS 26.448 version 12.1.0 Release 12)", Jan. 2015, ETSI TS 126 448, 24 pages total.

Communication dated Apr. 26, 2019, issued by the European Patent Office in counterpart European Application No. 17815768.1.

* cited by examiner

SIGNAL PROCESSING METHOD AND DEVICE ADAPTIVE TO NOISE ENVIRONMENT AND TERMINAL DEVICE EMPLOYING SAME

TECHNICAL FIELD

The present disclosure relates to audio and/or speech signal processing and, more particularly, to a signal processing method and apparatus for changing an audio and/or speech signal adaptively to a reception-end or near-end noisy environment and a terminal device employing the same.

BACKGROUND ART

When a voice call with a counterpart is made by using a mobile device in an environment having various kinds of background noise, a voice of the counterpart may not be heard well due to the background noise. For example, when a call is made at a noisy place such as a subway platform or in the street on which vehicles pass, a voice of a counterpart is heard much lower than that of a call at a calm place without noise. The biggest reason for making background noise lower intelligibility or sound quality of a voice may be described by a masking effect.

Various voice processing methods are provided in consideration of background noise, and particularly, the voice processing methods may be classified according to far-end and near-end environments. The voice processing methods in consideration of the far-end environments have a limitation in that various near-end background noise environments are not considered. Accordingly, a technique capable of efficiently processing a voice signal transmitted from a far-end device or provided from a transmission module, according to background noise around a user of a near-end device or a reception module, in consideration of various reception environments having background noise is needed.

DESCRIPTION OF EMBODIMENTS

Technical Problem

Provided are a signal processing method and apparatus for changing a signal, which has been decoded by a reception side or a near end, adaptively to a reception-side or near-end noisy environment to enhance call quality and to enhance intelligibility and/or sound quality of the decoded signal and a computer-readable recording medium.

Provided is a terminal device employing the signal processing method or apparatus or the recording medium.

Solution to Problem

According to an aspect of the present disclosure, a signal processing method includes: determining a class related to enhancement of intelligibility, based on a noise spectrum of a reception side or a near-end device and a received voice spectrum; generating guide information for the enhancement of intelligibility based on the noise spectrum, the voice spectrum, and the determined class; and generating a changed voice spectrum by applying the guide information to the voice spectrum.

According to another aspect of the present disclosure, a signal processing method includes: determining a band class related to enhancement of intelligibility for each band of a noise spectrum of a reception side or a near-end device and a received voice spectrum of a counterpart; generating guide information for the enhancement of intelligibility based on the determined band class of the noise spectrum and the determined band class of the voice spectrum; and generating a changed voice spectrum by applying the guide information to the voice spectrum.

According to another aspect of the present disclosure, a signal processing apparatus includes: a first receiver configured to receive a noise signal of a reception side or a near-end device through a microphone; a second receiver configured to receive a voice signal of a counterpart from a transmission-side or far-end device; and a processor configured to determine a class related to enhancement of intelligibility of the voice signal with respect to each of the noise signal and the voice signal, generate guide information for the enhancement of intelligibility based on the noise spectrum, the voice spectrum, and the determined class, and generate a changed voice spectrum by applying the guide information to the voice spectrum.

According to another aspect of the present disclosure, a signal processing apparatus includes: a first receiver configured to receive a noise signal of a reception side or a near-end device through a microphone; a second receiver configured to receive a voice signal of a counterpart from a transmission-side or far-end device; and a processor configured to determine a band class related to enhancement of intelligibility for each band of the noise signal and the voice signal, generate guide information for the enhancement of intelligibility based on the determined band class of the noise spectrum and the determined band class of the voice spectrum, and generate a changed voice spectrum by applying the guide information to the voice signal.

According to another aspect of the present disclosure, a computer-readable recording medium has recorded thereon instructions by which each of the signal processing methods is executable.

According to another aspect of the present disclosure, a terminal device includes: at least one microphone configured to receive a surrounding environmental signal including a voice signal of a narrator and/or a noise signal; and a processor configured to determine a class related to enhancement of intelligibility, based on a noise spectrum of a reception side or a near-end device and a received voice spectrum of a counterpart, generate guide information for the enhancement of intelligibility based on the noise spectrum, the voice spectrum, and the determined class, generate a changed voice spectrum by applying the guide information to the voice spectrum, and provide the changed voice spectrum to a speaker.

Advantageous Effects of Disclosure

Call quality may be enhanced adaptively to a noisy environment of a reception side or a near end. In addition, intelligibility and/or sound quality may be enhanced while minimizing a tone change. In addition, intelligibility of a decoded audio and/or speech signal may be enhanced in response to a volume level of a terminal and an intention of a user based on a user input.

MODE OF DISCLOSURE

The present disclosure may allow various kinds of change or modification and have various embodiments, and specific embodiments will be illustrated in drawings and described in detail in the specification. However, it should be understood that the specific embodiments do not limit the present disclosure to a specific disclosing form but include every modified, equivalent, or replaced one within the spirit and technical scope of the present disclosure. In the description of the embodiments, when it is determined that a specific description of relevant well-known features may obscure the essentials of the present disclosure, a detailed description thereof is omitted.

Although terms, such as 'first' and 'second', can be used to describe various elements, the elements are not limited by the terms. The terms are used only to classify a certain element from another element.

The terminology used in the present disclosure is used only to describe specific embodiments and does not have any intention to limit the present disclosure. The terms used in present disclosure are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

An expression in the singular includes an expression in the plural unless they are clearly different from each other in context. In the present disclosure, it should be understood that term, such as "include" or "have", are used to indicate the existence of an implemented feature, number, step, operation, element, part, or a combination thereof without excluding in advance the possibility of the existence or addition of one or more other features, numbers, steps, operations, elements, parts, or combinations thereof.

A signal to be processed in the present disclosure includes an audio signal including music, a speech signal, a mixed signal of the audio signal and the speech signal, and the like but is referred to as a voice signal for convenience of description.

In the present disclosure, a signal can be processed in superframe units, frame units, or subframe units but will be processed, as an example, in frame units for convenience of description.

Hereinafter, embodiments will be described in detail with reference to the accompanying drawings.

Figure 1:
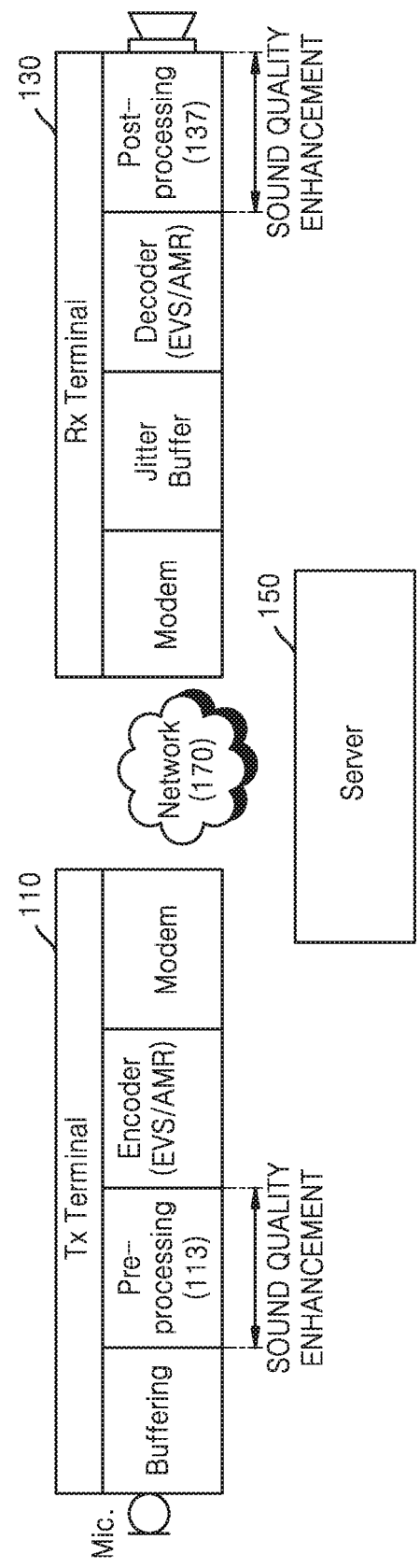
FIG. 1 illustrates a structure of transmission and reception ends for a voice call and a packet network.

FIG. 1 illustrates a structure of transmission and reception terminals for a voice call, to which a signal processing apparatus according to the present disclosure is applied, and a server network. An example of the network used in FIG. 1 is a long term evolution (LTE) network, and a packet-based voice call service in the LTE network is referred to as voice over long term evolution (VoLTE). The signal processing apparatus according to the present disclosure may be applied to not only VoLTE but also a voice call service of a circuit switching scheme.

Generally, to achieve a voice call, a call condition negotiation process may be previously performed through a signaling path between a transmission end and a reception end in a network structure including a transmission terminal, a network of an operator A, to which the transmission terminal is connected, a reception terminal, and a network of an operator B, to which the reception terminal is connected. Through the call condition negotiation process, at least one of a transmission rate, a codec, a codec bit rate, a sampling frequency Fs, a bandwidth, and the number of channels may be determined. The transmission rate indicates a data amount of a communication channel, which is required for actual transmission, and the codec may indicate the name of an actually used voice codec. Examples of the codec may include an adaptive multi-rate (AMR) codec, an AMR-wideband (AMR-WB) codec, an enhanced voice services (EVS) codec, an enhanced variable rate codec (EVRC), and the like but are not limited thereto. The codec bit rate indicates a bit rate to be used for the determined codec, wherein a voice signal may be compressed according to the negotiated codec bit rate and compressed data may be transmitted to a reception end through a packet network. Each codec includes a plurality of modes having various bit rates, and a bit rate used in each mode may be previously defined. The sampling frequency indicates a sampling frequency of an encoder input signal or decoder output signal of the codec. The bandwidth indicates a bandwidth of a signal and indicates a bandwidth in which actual encoding occurs unlike the sampling frequency. Examples of a signal band supported by the EVS codec are a narrowband (NB) (20 to 4,000 Hz), a wideband (WB) (20 to 8,000 Hz), a super wideband (SWB) (20 to 16,000 Hz), and a full band (FB) (20 to 20,000 Hz), and actual encoding may be performed for bandwidths lower than a band supported at each sampling frequency. For example, bands supportable at a sampling frequency of 32 KHz are the FB, the SWB, the WB, and the NB. In addition, the number of channels indicates the number of channels supported from a signal to be encoded or a decoded signal, such as a mono or stereo signal.

When the call condition negotiation process is completed, the transmission end may perform encoding, and the reception end may perform decoding. A bitstream generated as a result of the encoding, may be transmitted to the reception end through a media path. For a VoLTE service, data compressed by the transmission end may be transmitted in a wireless manner up to a radio access network (RAN) through a modem and transmitted from the RAN to an operator for a counterpart through a packet switched (PS) domain. The operator used by the reception end may be the same as or different from an operator used by the transmission end.

Referring to FIG. 1, a transmission (Tx) terminal 110 corresponds to a transmission-end device, and a reception (Rx) terminal 130 corresponds to a reception-end device. A signal processing algorithm related to enhancement of sound quality and/or intelligibility, which is to be described below, according to an embodiment may be loaded on at least one of the Tx and Rx terminals 110 and 130 or loaded on a server 150 connected to the Tx and Rx terminals 110 and 130 through a network 170. Alternatively, the signal processing algorithm according to an embodiment may be loaded on all of the Tx and Rx terminals 110 and 130 and the server 150.

The network 170 connects the Tx terminal 110, the Rx terminal 130, and the server 150. The network 170 includes a dedicated line, a local area network (LAN), a value-added network (VAN), an intranet, a private telephone network, a public telephone network, and a public switched telephone network (PSTN), taken alone or in combination and may include a wired Internet, a wireless Internet, and a mobile wireless communication network as a comprehensive data communication network enabling network forming entities shown in FIG. 1 to smoothly communicate with each other.

The Tx terminal 110 and the Rx terminal 130 may be Tx and Rx terminals disclosed with reference to FIGS. 2 to 5, which are to be described below, and may use a packet network structure.

When a call negotiation is completed and a transmission-end noise signal and a transmission-end voice signal are input to the Tx terminal 110, the Tx terminal 110 may transmit information on transmission-end noise to the server 150. When the call negotiation is completed and a reception-end noise signal is input to the Rx terminal 130, the Rx terminal 130 may transmit information on reception-end noise to the server 150. According to another embodiment, the Tx terminal 110 or the Rx terminal 130 may further transmit context information of each call to the server 150.

The server 150 may determine at least one parameter for a sound quality enhancement algorithm, which is to be applied to a pre-processor 113, for the Tx terminal 110 to enhance sound quality of the transmission-end voice signal, based on the transmission-end noise information received from the Tx terminal 110. In addition, the server 150 may determine at least one parameter for the sound quality enhancement algorithm, which is to be applied to a post-processor 137, for the Rx terminal 130 to enhance sound quality of the transmission-end voice signal, based on the reception-end noise information received from the Rx terminal 130. The at least one parameter for the sound quality enhancement algorithm may be referred to as spectrum-specific guide information or gain information as described below.

When the at least one parameter for the sound quality enhancement algorithm, which is to be applied to the pre-processor 113 of the Tx terminal 110, is determined, the server 150 transmits the at least one parameter for the sound quality enhancement algorithm to the Tx terminal 110. The Tx terminal 110 may enhance sound quality and/or intelligibility of the input transmission-end voice signal by performing pre-processing using the at least one parameter for the sound quality enhancement algorithm, which has been transmitted from the server 150. According to an embodiment, in the pre-processing process, noise suppression or echo cancelling may be included. The Tx terminal 110 transmits, to the Rx terminal 130, a transmission-end voice signal of which sound quality and/or intelligibility have been enhanced through the pre-processing.

In addition, when the at least one parameter for the sound quality enhancement algorithm, which is to be applied to the post-processor 137 of the Rx terminal 130, is determined, the server 150 transmits the at least one parameter for the sound quality enhancement algorithm to the Rx terminal 130. Upon receiving the at least one parameter for the sound quality enhancement algorithm from the server 150, the Rx terminal 130 may enhance sound quality and/or intelligibility of the transmission-end voice signal received from the Tx terminal 110, by performing post-processing using the at least one parameter for the sound quality enhancement algorithm. According to an embodiment, in the post-processing process, dynamic voice enhancement (DyVE) may be further included.

The Tx terminal 110, the Rx terminal 130, and the server 150 may further include a communication interface, a controller, a storage, a processor, a display, and a user input unit (not shown).

Figure 2:
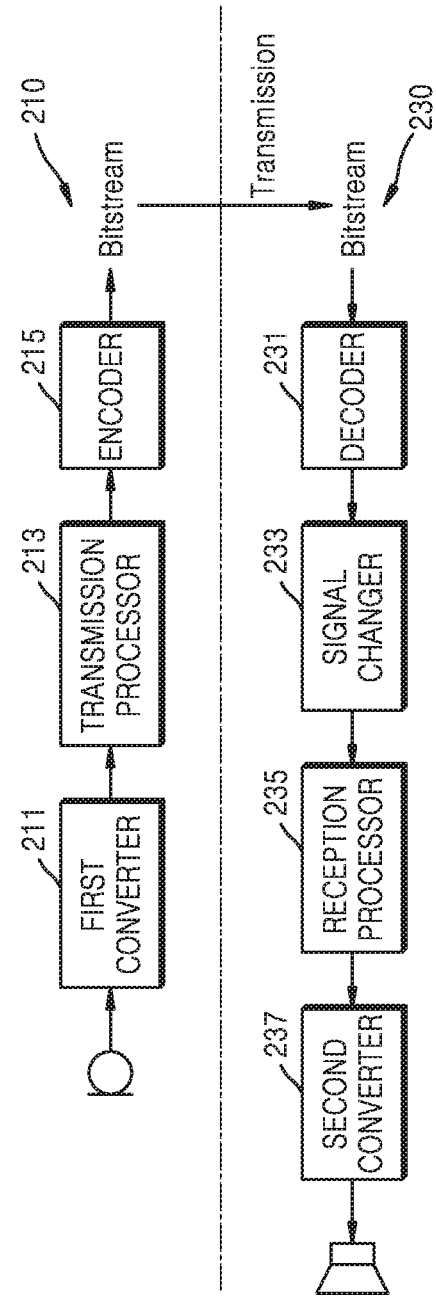
FIG. 2 is a block diagram of a mobile communication device for a voice call, according to an embodiment.

FIG. 2 is a block diagram of a mobile communication device for a voice call, according to an embodiment.

The mobile communication device shown in FIG. 2 may include a far-end device 210 and a near-end device 230, the far-end device 210 may include a first converter 211, a transmission processor 213, and an encoder 215, and the near-end device 230 may include a decoder 231, a signal changer 233, a reception processor 235, and a second converter 237. The components in the far-end device 210 and/or the near-end device 230 may be implemented by being integrated in at least one processor except for a case where each component thereof should be implemented with separate hardware. The far-end device 210 and the near-end device 230 may be provided to a transmission side and a reception side of pieces of user equipments, respectively.

In FIG. 2, the first converter 211 may convert an analog signal provided through an input device such as a microphone into a digital signal.

The transmission processor 213 may perform various kinds of signal processing on the digital signal provided from the first converter 211. Examples of the signal processing include noise cancellation, echo reduction, and the like but are not limited thereto.

The encoder 215 may encode a signal provided from the transmission processor 213, by using a pre-defined codec. A bitstream generated as a result of the encoding may be transmitted to the reception side through a transmission channel or stored in a storage medium such that the bitstream is used for decoding.

The decoder 231 may decode the received bitstream by using a pre-defined codec.

The signal changer 233 may change the decoded signal according to a reception environment, in response to an environmental noise signal of a near-end terminal. The signal changer 233 may change the decoded signal according to the reception environment, in response to terminal state information such as a volume level and a user input related to volume adjustment. According to an embodiment, the signal changer 233 may determine a band class related to enhancement of intelligibility for each band of a noise signal and a voice signal, generate guide information for the enhancement of intelligibility based on the determined band class of the noise signal and the determined band class of the voice signal, and generate a changed voice signal by applying the guide information to the voice signal.

According to another embodiment, the signal changer 233 may determine a class related to enhancement of intelligibility based on a noise spectrum of a reception side or a near-end device and a received voice spectrum, generate guide information for the enhancement of intelligibility based on the noise spectrum, the voice spectrum, and the determined class, and generate a changed voice spectrum by applying the guide information to the voice spectrum. To this end, guide information, e.g., frequency bin-specific gain information, may be generated based on a voice intelligibility model modeled from the noise spectrum, the voice spectrum, a voice spectrum to which the generated guide information has been reflected, and the determined class.

The reception processor 235 may perform various kinds of signal processing on a signal provided from the signal changer 233. Examples of the signal processing include noise cancellation, high frequency restoration, and the like but are not limited thereto.

The second converter 237 may convert a signal provided from the reception processor 235 into an analog signal. The analog signal provided from the second converter 237 may be played back through a speaker or a receiver.

An example of a codec used in FIG. 2 may be an EVS codec.

Figure 3:
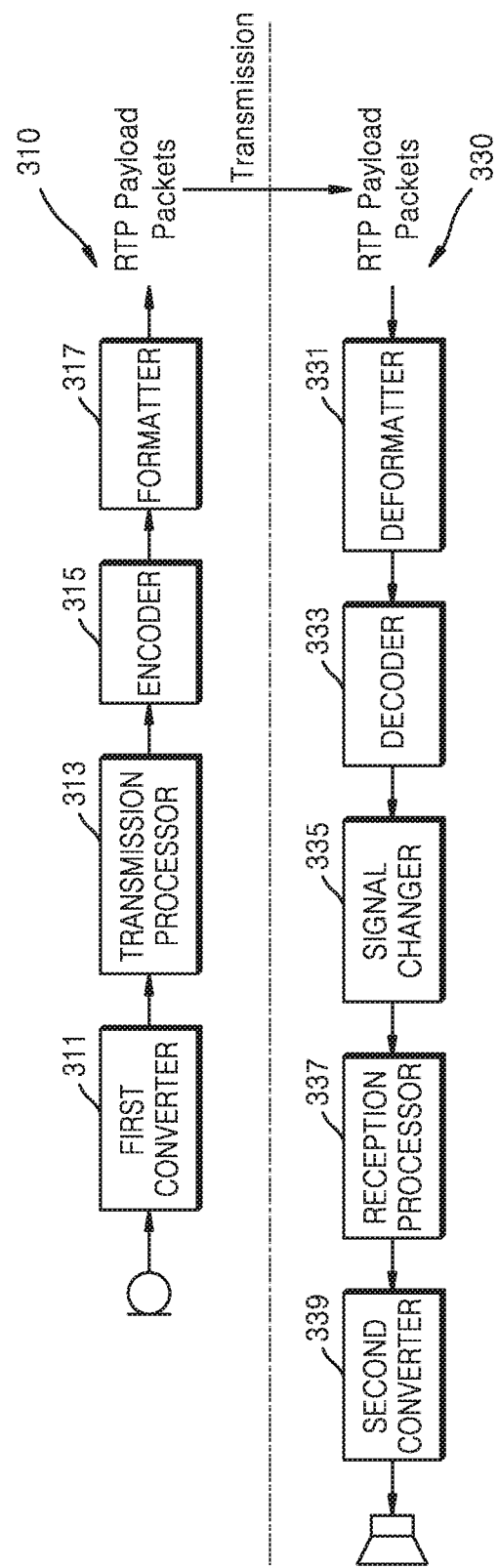
FIG. 3 is a block diagram of a mobile communication device for a voice call in a packet network, according to an embodiment.

FIG. 3 is a block diagram of a mobile communication device for a voice call in a packet network, according to an embodiment.

The mobile communication device shown in FIG. 3 may include a far-end device 310 and a near-end device 330, the far-end device 310 may include a first converter 311, a transmission processor 313, an encoder 315, and a formatter 317, and the near-end device 330 may include a deformatter 331, a decoder 333, a signal changer 335, a reception processor 337, and a second converter 339. The components in the far-end device 310 and/or the near-end device 330 may be implemented by being integrated in at least one processor except for a case where each component thereof should be implemented with separate hardware. The far-end device 310 and the near-end device 330 may be provided to a transmission side and a reception side of pieces of user equipments, respectively. The mobile communication device in FIG. 3 share the components in FIG. 2 except for the formatter 317 and the deformatter 331, and thus, a duplicate operation thereof is not described.

In FIG. 3, the formatter 317 may format a bitstream provided from the encoder 315 to a real-time transport protocol (RTP) payload packet for communication in a packet network. The RTP payload packet generated by the formatter 317 may be transmitted to the reception side through a transmission channel or stored in a storage medium such that the RTP payload packet is used for decoding.

The deformatter 331 may extract necessary information by deformatting the received RTP payload packet. Examples of the necessary information may include time stamp information, packet loss information, an EVS bitstream, and the like.

The decoder 333 may include a jitter buffer manager (not shown) and may offset network jitter by using the information extracted by the deformatter 331 and then perform decoding processing.

An example of a codec used in FIG. 3 may be an EVS codec.

Figure 4:
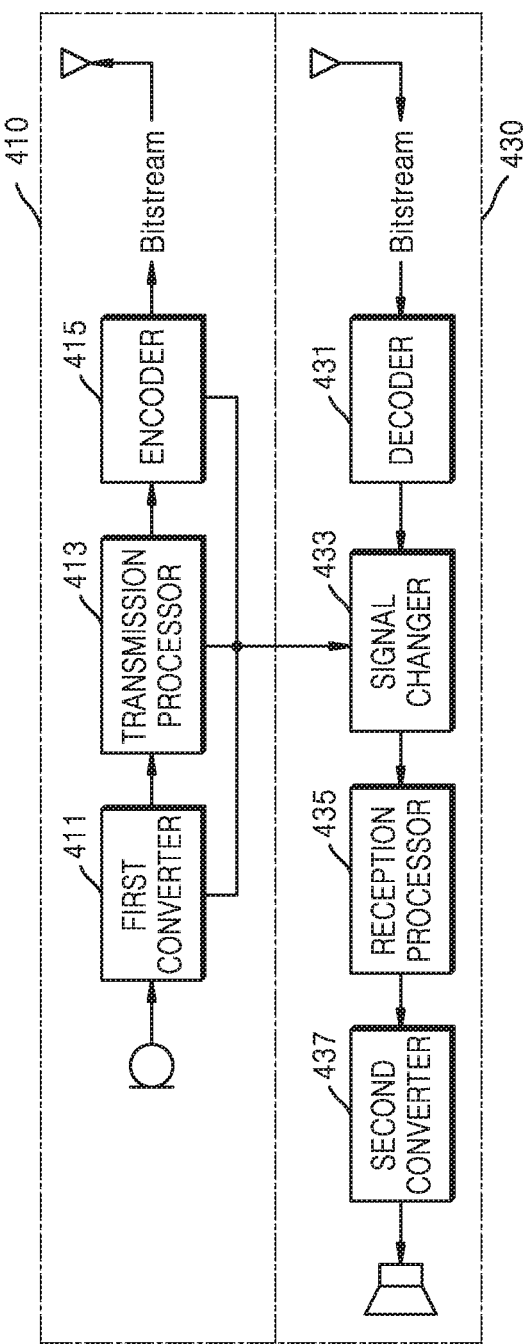
FIG. 4 is a block diagram of a mobile communication device for a voice call, according to another embodiment.

FIG. 4 is a block diagram of a mobile communication device for a voice call, according to another embodiment.

The mobile communication device shown in FIG. 4 may include a transmission module 410 and a reception module 430, the transmission module 410 may include a first converter 411, a transmission processor 413, and an encoder 415, and the reception module 430 may include a decoder 431, a signal changer 433, a reception processor 435, and a second converter 437. The components in the transmission module 410 and/or the reception module 430 may be implemented by being integrated in at least one processor except for a case where each component thereof should be implemented with separate hardware. The transmission module 410 and the reception module 430 may be provided to a transmission side and a reception side of a near-end device, respectively. The components in FIG. 4 are the same as those in FIG. 2 except that the components in FIG. 4 are included in the transmission module 410 and the reception module 430, and thus, a detailed operation thereof is not described. In addition, since the transmission module 410 and the reception module 430 are included in one near-end device, output signals of the first converter 411 and the transmission processor 413 or an encoding parameter used in the encoder 415 may be provided to the signal changer 433. In addition, the signal changer 433 may further receive terminal state information or a user input related to volume control.

Figure 5:
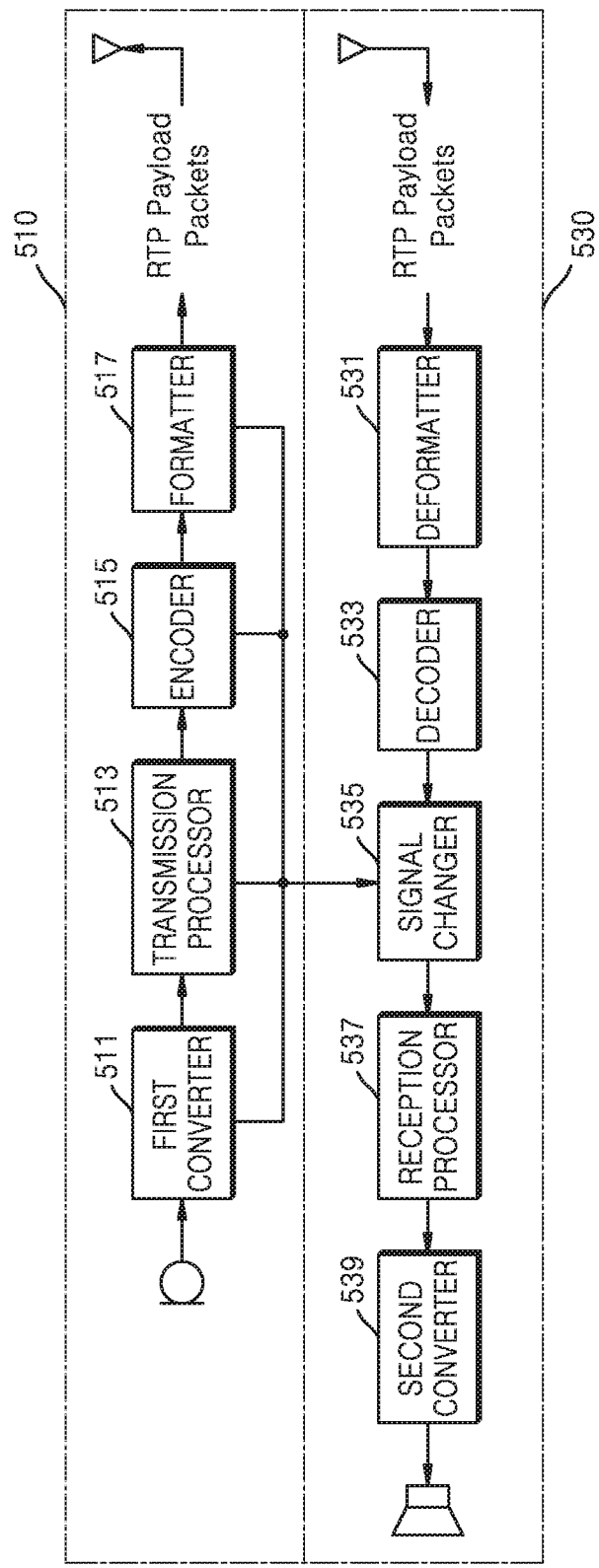
FIG. 5 is a block diagram of a mobile communication device for a voice call in a packet network, according to another embodiment.

FIG. 5 is a block diagram of a mobile communication device for a voice call in a packet network, according to another embodiment.

The mobile communication device shown in FIG. 5 may include a transmission module 510 and a reception module 530, the transmission module 510 may include a first converter 511, a transmission processor 513, an encoder 515, and a formatter 517, and the reception module 530 may include a deformatter 531, a decoder 533, a signal changer 535, a reception processor 537, and a second converter 539. The components in the transmission module 510 and/or the reception module 530 may be implemented by being integrated in at least one processor except for a case where each component thereof should be implemented with separate hardware. The transmission module 510 and the reception module 530 may be provided to a transmission side and a reception side of a near-end device, respectively. The components in FIG. 5 are the same as those in FIG. 3 except that the components in FIG. 5 are included in the transmission module 510 and the reception module 530, and thus, a detailed operation thereof is not described. In addition, since the transmission module 510 and the reception module 530 are included in one near-end device, information obtained from a signal processing process of the first converter 511, the transmission processor 513, the encoder 515, and the formatter 517 may be provided to the signal changer 535. In addition, the signal changer 535 may further receive terminal state information or a user input related to volume control.

Figure 6:
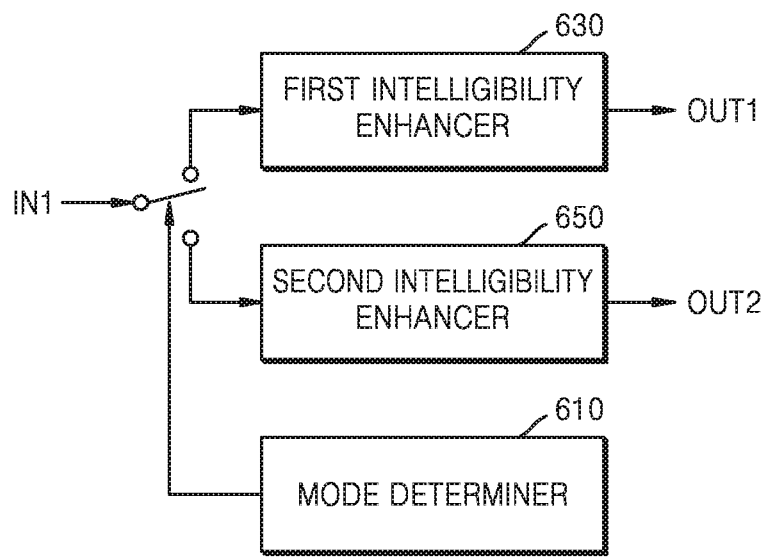
FIG. 6 is a block diagram of a signal processing apparatus according to an embodiment.

FIG. 6 is a block diagram of a signal processing apparatus according to an embodiment and may correspond to the signal changers 233, 335, 433, and 535 in FIGS. 2 to 5. The signal processing apparatus shown in FIG. 6 may be embedded in a near-end device or a reception module or detachably implemented in a terminal device.

The signal processing apparatus shown in FIG. 6 may include a mode determiner 610, a first intelligibility enhancer 630, and a second intelligibility enhancer 650. Herein, the mode determiner 610 and the second intelligibility enhancer 650 may be optional, and thus, the signal processing apparatus may be implemented using the first intelligibility enhancer 630.

Intelligibility is a measure indicating quality of a voice and may be indicated by a ratio indicating how well a listener understands a syllable of an actual voice signal. Alternatively, intelligibility is a measure indicating a degree of understanding with respect to a meaningful word or sentence, and the higher the intelligibility, the higher the degree of understanding.

Intelligibility is measured as a numeric value such as a speech transmission index (STI) or a direct sound to reflected sound ratio (D_50) but does not have a proportional relationship with objective sound quality such as a signal to noise ratio (SNR) and may have a feature of being subjective and perceptual according to listeners. Therefore, the enhancement of intelligibility may correspond to a method of enhancing subjective sound quality.

Referring to FIG. 6, the mode determiner 610 may determine one of a first mode and a second mode by determining whether a volume-up input is additionally received from a user when a reception volume reaches a set maximum value.

According to another embodiment, the mode determiner 610 may determine the first mode or the second mode when disaster broadcast is received or an emergency situation such as a 911 dial is detected. Herein, the first mode may be referred to as a basic mode, and the second mode may be referred to as an aggressive mode. According to an embodiment, the first mode is set as a default.

The first intelligibility enhancer 630 operates when the first mode is determined by the mode determiner 610 and may determine a band class related to enhancement of intelligibility for each band of a noise signal and a voice signal, generate guide information for the enhancement of intelligibility based on the determined band class of the noise signal and the determined band class of the voice signal, and generate a changed voice signal by applying the guide information to the voice signal. In this case, signal processing may be performed such that the total energy of a frame is conserved. As a result, even when the voice signal is changed, a tone change may be minimized.

According to another embodiment, the first intelligibility enhancer 630 may determine a class related to enhancement of intelligibility based on a noise spectrum of a reception side or a near-end device and a received voice spectrum, generate guide information for the enhancement of intelligibility based on the noise spectrum, the voice spectrum, and the determined class, and generate a changed voice spectrum by applying the guide information to the voice spectrum. To this end, guide information, e.g., frequency bin-specific gain information, may be generated based on a voice intelligibility model modeled from the noise spectrum, the voice spectrum, a voice spectrum to which the generated guide information has been reflected, and the determined class.

The second intelligibility enhancer 650 operates when the second mode is determined by the mode determiner 610, and operates in the same way as the first intelligibility enhancer 630 except that signal processing may be performed so as to allow an increase in the total energy of a frame by a predetermined percentage, e.g., about 20%. According to another embodiment, the second intelligibility enhancer 650 may additionally increase energy for an active band among effective bands for the enhancement of intelligibility, which have been determined by the first intelligibility enhancer 630. According to another embodiment, the second intelligibility enhancer 650 may set a constant of a Lim value or a tone masking noise (TMN) value used in the first intelligibility enhancer 630 to a larger value.

Figure 7:
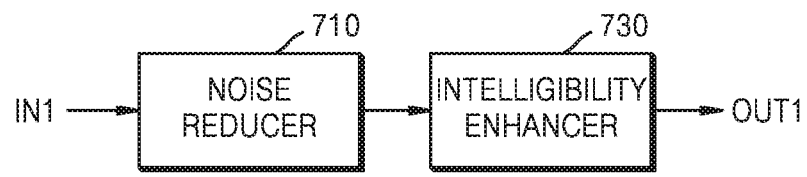
FIG. 7 is a block diagram of a signal processing apparatus according to another embodiment.

FIG. 7 is a block diagram of a signal processing apparatus according to another embodiment, and may correspond to the signal changers 233, 335, 433, and 535 in FIGS. 2 to 5.

The signal processing apparatus shown in FIG. 7 may include a noise reducer 710 and an intelligibility enhancer 730. Herein, the intelligibility enhancer 730 may be implemented as in FIG. 6. The noise reducer 710 may not be used according to the necessity of a terminal user or conditions such as a reception environment.

Referring to FIG. 7, the noise reducer 710 may reduce or remove coding artifacts such as high frequency noise generated in an encoding process. According to another embodiment, the noise reducer 710 may reduce noise from an entire reception signal by using a noise signal received from a microphone.

The intelligibility enhancer 730 may enhance intelligibility of a decoded signal or an output signal of the noise reducer 710 based on an environmental noise signal of a near-end terminal. In this case, the intelligibility enhancer 730 may operate in the aggressive mode by additionally receiving terminal state information and a user input related to volume-up. Herein, the terminal state information may relate to whether a volume level reaches a maximum value, and the user input may relate to whether a user has pushed a volume-up button after the volume level reaches the maximum value. When the user has continuously pushed the volume-up button a predetermined number or more of times after the volume level reaches the maximum value, or when the user has pushed the volume-up button at least once within a predetermined time after the volume level reaches the maximum value, the aggressive mode may be activated. According to another embodiment, the user may directly input a command for the aggressive mode through the user's voice or a user interface. According to another embodiment, the aggressive mode may also be activated when a surrounding noise level is higher than a preset maximum value.

Figure 8:
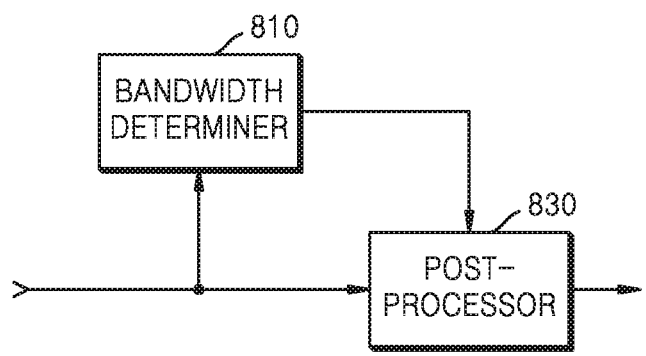
FIG. 8 is a detailed block diagram of a coding artifact reducer shown in FIG. 7.

FIG. 8 is a detailed block diagram of a noise reducer 710 shown in FIG. 7.

The noise reducer 710 shown in FIG. 8 may include a bandwidth determiner 810 and a post-processor 830 and may be implemented by at least one processor.

Referring to FIG. 8, the bandwidth determiner 810 may detect an optimal coding bandwidth of a decoded signal based on decoding band information, a decoding sampling frequency, and a decoding bit rate to determine a decoding bandwidth. Herein, the decoding band information may be an NB, a WB, an SWB, or an FB.

The post-processor 830 may remove high frequency noise transmitted together in an encoding process by performing low-pass filtering based on the optimal coding bandwidth detected by the bandwidth determiner 810.

Figure 9:
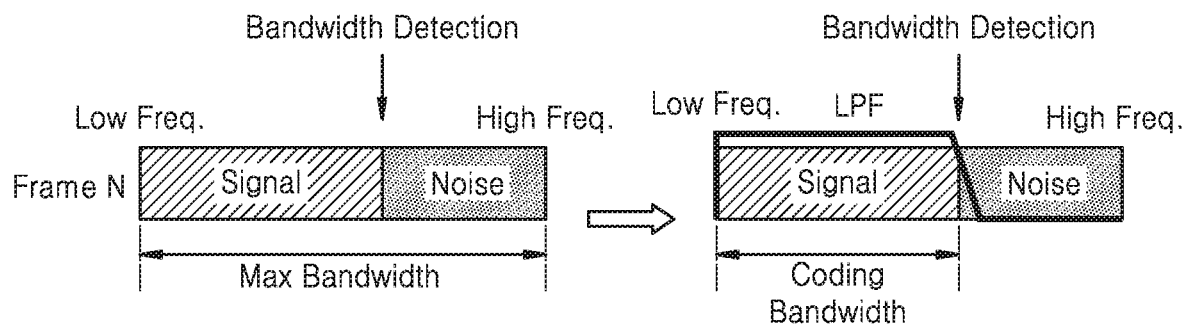
FIG. 9 illustrates an operation of the coding artifact reducer shown in FIG. 7.

FIG. 9 illustrates an operation of the noise reducer 710 shown in FIG. 7 and shows that noise in a high frequency band is removed by performing low-pass filtering based on a detected optimal coding bandwidth.

Figure 10:
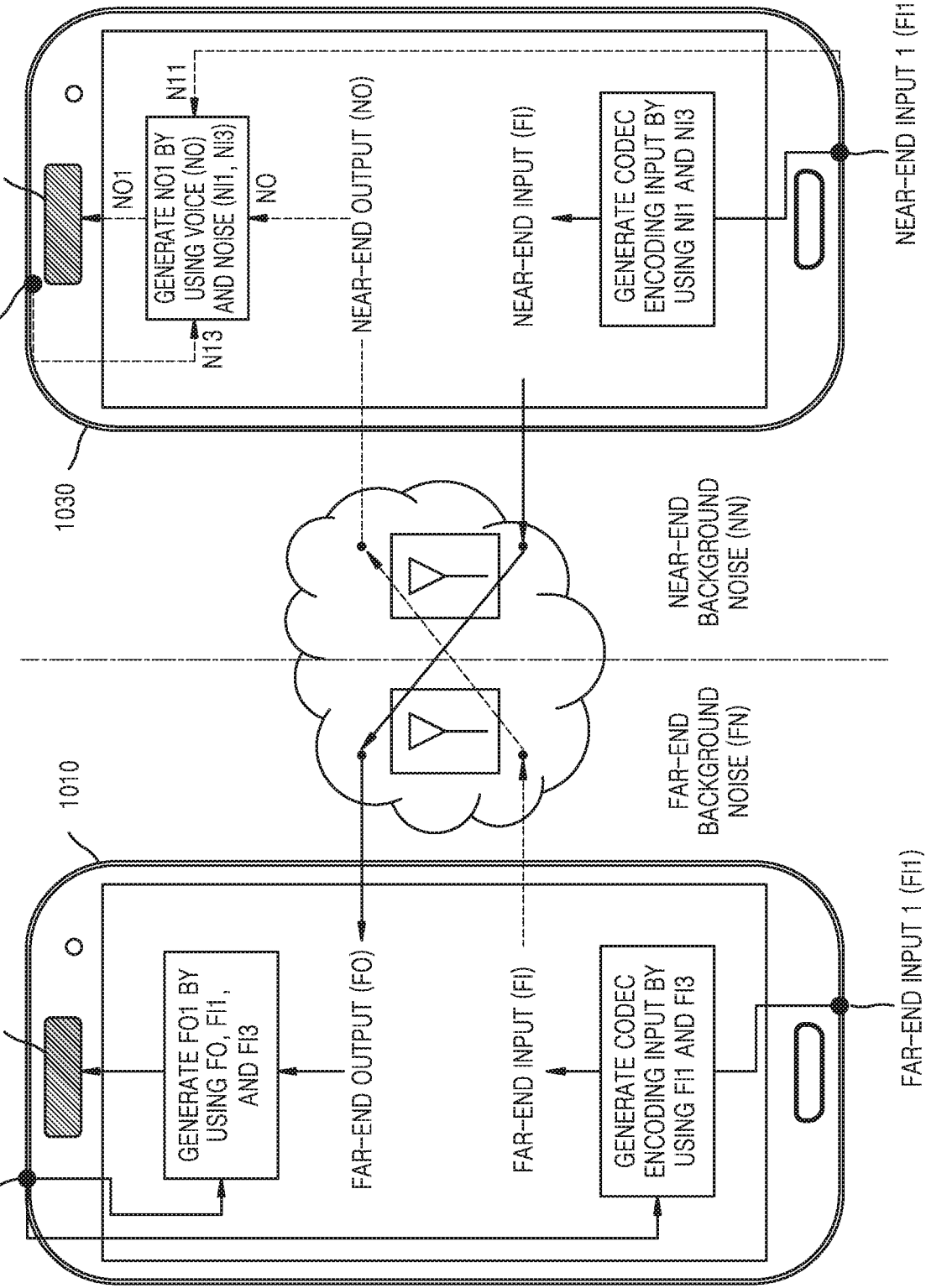
FIG. 10 illustrates signals for generation of a far-end input and output and a near-end input and output in a far-end device and a near-end device, according to an embodiment.

FIG. 10 illustrates signals for generation of a far-end input and output and a near-end input and output in a far-end device 1010 and a near-end device 1030, according to an embodiment, wherein a terminal includes two microphones. According to the present embodiment, for enhancement of intelligibility, noise NI1 from a first microphone located on a lower end or the front surface or rear surface of the lower end and noise N12 from a third microphone located on an upper end or the front surface or rear surface of the upper end may be used.

A reception end output NO is a signal obtained by transmitting a transmission end input voice signal F1 to a reception-end device through a network, and a final output signal NO1 is generated by using reception-end noise received through microphones of the reception-end device.

Figure 11:
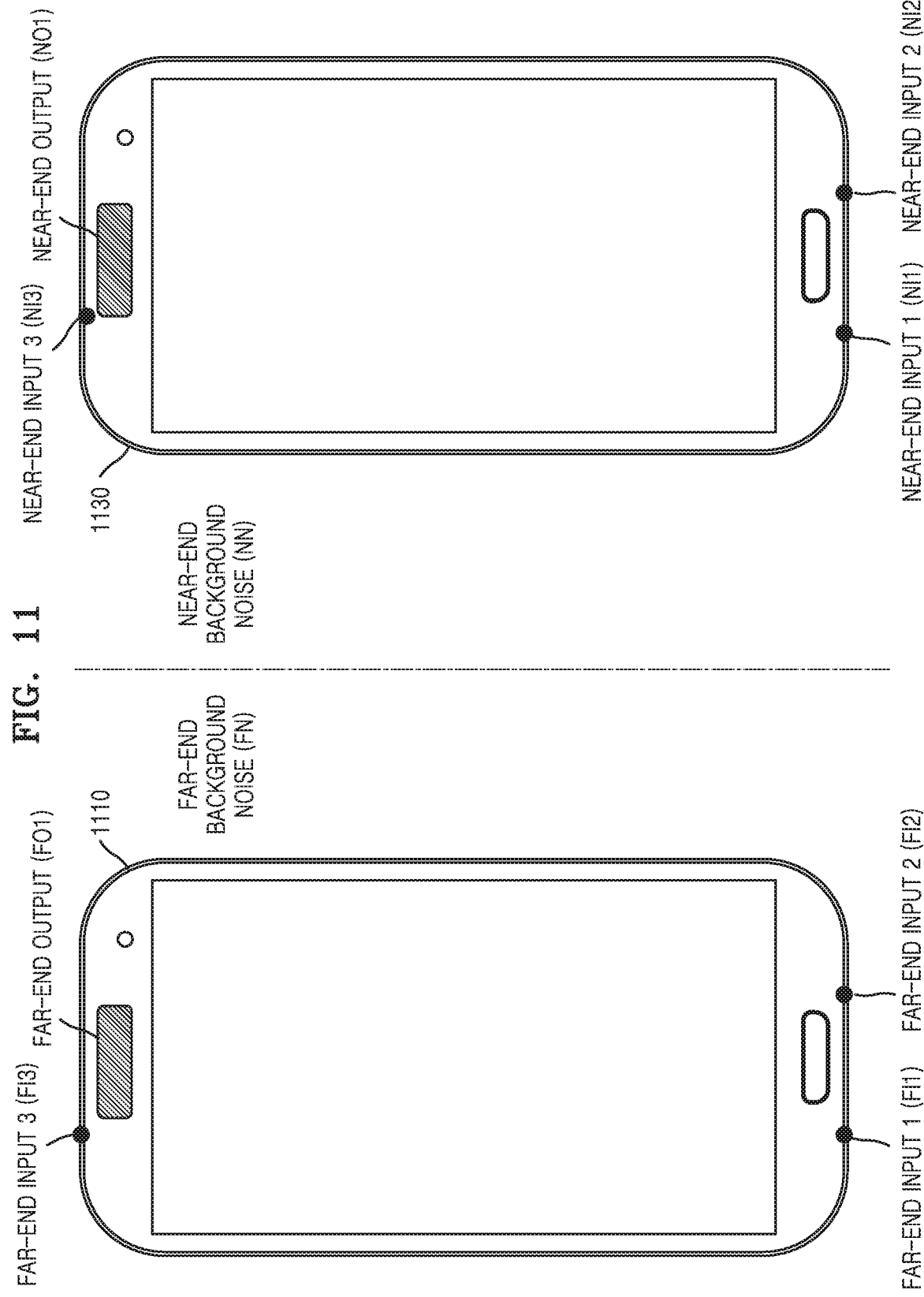
FIG. 11 illustrates signals for generation of a far-end input and output and a near-end input and output in a far-end device and a near-end device, according to another embodiment.

FIG. 11 illustrates signals for generation of a far-end input and output and a near-end input and output in a far-end device 1110 and a near-end device 1130, according to another embodiment, wherein a terminal includes three microphones. According to the present embodiment, for enhancement of intelligibility, noise NI1 or N12 from a first or second microphone located on a lower end or the front surface or rear surface of the lower end and noise N13 from a third microphone located on an upper end or the front surface or rear surface of the upper end may be used.

Although FIGS. 10 and 11 illustrate two microphones and three microphones, respectively, a signal processing apparatus according to an embodiment is not limited to the number and/or locations of microphones.

According to FIGS. 10 and 11, a final output NO1 of a near-end device may be generated by changing an initial output NO of the near-end device to increase a volume based on noise provided from at least one microphone.

Figure 12:
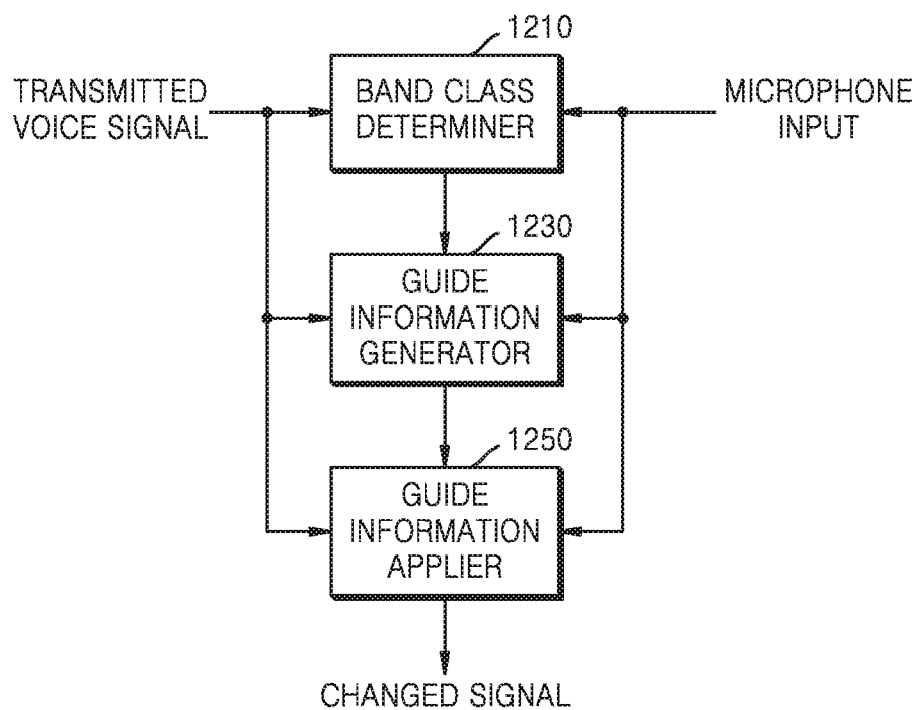
FIG. 12 is a detailed block diagram of a signal processing apparatus according to an embodiment.

FIG. 12 is a detailed block diagram of a signal processing apparatus according to an embodiment and may correspond to the first intelligibility enhancer 630 of FIG. 6 or the intelligibility enhancer 730 of FIG. 7.

The signal processing apparatus shown in FIG. 12 may include a band class determiner 1210, a guide information generator 1230, and a guide information applier 1250. The components may be integrated into at least one processor. Although not shown, a memory configured to store an input/output signal may be further included at a front end or rear end of each component.

Referring to FIG. 12, the band class determiner 1210 may determine a band class to select at least one effective band for enhancement of intelligibility for a transmitted voice signal and a noise signal input to a microphone. In this case, the band class may be determined based on a psychoacoustic principle for each of the voice signal and the noise signal.

The guide information generator 1230 may generate guide information for the enhancement of intelligibility based on the band class of the voice signal and the band class of the noise signal, which have been determined by the band class determiner 1210. The guide information may include an effective band on which the enhancement of intelligibility is to be performed and a change value for the effective band. The effective band may vary in frame units.

The guide information applier 1250 may generate a changed voice spectrum by applying the generated guide information to a voice spectrum.

Figure 13:
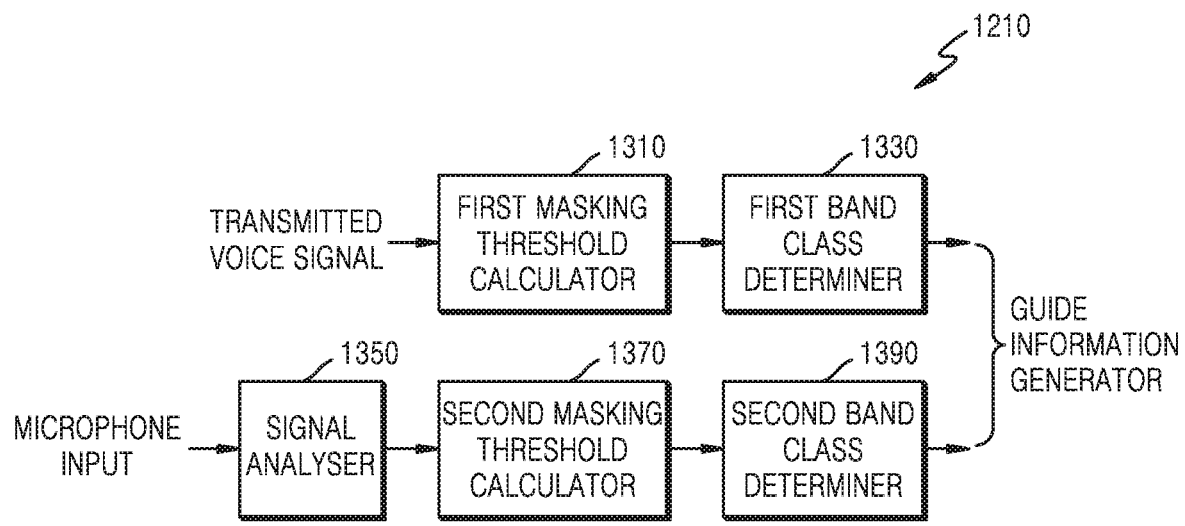
FIG. 13 is a detailed block diagram of a band class determiner shown in FIG. 12, according to an embodiment.

FIG. 13 is a detailed block diagram of the band class determiner 1210 shown in FIG. 12, according to an embodiment.

The band class determiner 1210 shown in FIG. 13 may include a first masking threshold calculator 1310, a first band class determiner 1330, a signal analyser 1350, a second masking threshold calculator 1370, and a second band class determiner 1390. The components may be integrated into at least one processor. Although not shown, a memory configured to store an input/output signal may be further included at a front end or rear end of each component.

Referring to FIG. 13, the first masking threshold calculator 1310 may estimate a voice masking threshold by analysing a voice signal transformed to a frequency domain. The voice masking threshold may be calculated based on a psychoacoustic principle, and, for example, a method used in a Moving Picture Experts Group (MPEG) standard may be applied thereto. The voice masking threshold may vary according to bands.

The first band class determiner 1330 may determine a class for each band of a voice signal based on the voice masking threshold obtained by the first masking threshold calculator 1310. The first band class determiner 1330 may classify a voice signal into a donation band and a residual band based on a frequency band and classify the residual band into an active band or an in-active band according to a comparison result between energy of the voice signal and the voice masking threshold. In detail, a donation class corresponds to a band located in a low frequency band, and at least one band from the lowest band may be set to the donation class. When energy of a voice signal is greater than or equal to the voice masking threshold, the voice signal may be set to the active class; otherwise, the voice signal may be set to the in-active class.

The signal analyser 1350 may extract a noise signal by analysing a signal received from a microphone. Various well-known methods may be applied to the extraction of the noise signal.

The second masking threshold calculator 1370 may estimate a noise masking threshold by analysing the noise signal provided from the signal analyser 1350. Likewise, the noise masking threshold may be calculated based on a psychoacoustic principle, and for example, a method used in an MPEG standard may be applied thereto. The noise masking threshold may also vary according to bands.

The second band class determiner 1390 may determine a class for each band of the noise signal based on the noise masking threshold calculated by the second masking threshold calculator 1370. In this case, the noise signal may be classified into an active band or an in-active band according to a comparison result between energy of the noise signal and the noise masking threshold. When the energy of the noise signal is greater than or equal to the noise masking threshold, the noise signal may be set to an active class; otherwise, the noise signal may be set to an in-active class. The band class of the noise signal may be used to determine a band class of the voice signal. According to another embodiment, a band in the noise signal, which corresponds to the donation band of the voice signal, may be allocated to an in-active band.

Figure 14:
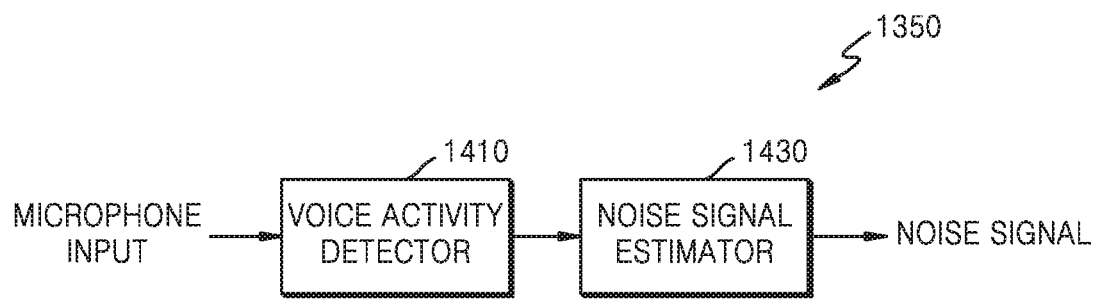
FIG. 14 is a detailed block diagram of a signal analyser shown in FIG. 13, according to an embodiment.

FIG. 14 is a detailed block diagram of the signal analyser 1350 shown in FIG. 13, according to an embodiment. Herein, signal analysis may be performed in frame or subframe units. In addition, a single frame or subframe may be processed in sub-band units. Herein, the sub-band may include threshold-band or Bark-band units and may be configured such that an interval between sub-bands is narrow in a lower band and wide in a higher band. Hereinafter, frame-unit signal analysis will be described as an example.

The signal analyser 1350 shown in FIG. 14 may include a voice activity detector 1410 and a noise signal estimator 1430.

Referring to FIG. 14, the voice activity detector 1410 may detect voice activity of a current frame input from a microphone. In this case, signal activity may also be used instead of the voice activity. In addition, a voice activity detection (VAD) or signal activity detection (SAD) unit embedded in a codec may be used instead of the voice activity detector 1410.

The noise signal estimator 1430 may classify the current frame into an active frame or an in-active frame according to a comparison result between the voice activity provided from the voice activity detector 1410 and a predetermined threshold. The active frame indicates a period in which a narrator speaks to a near-end terminal, and in this case, the noise signal estimator 1430 may estimate a noise signal of a previous in-active frame as a noise signal of the current frame. The in-active frame indicates a period in which the narrator does not speak, and in this case, the noise signal estimator 1430 may estimate an input signal of the microphone as a noise signal of the current frame.

Figure 15:
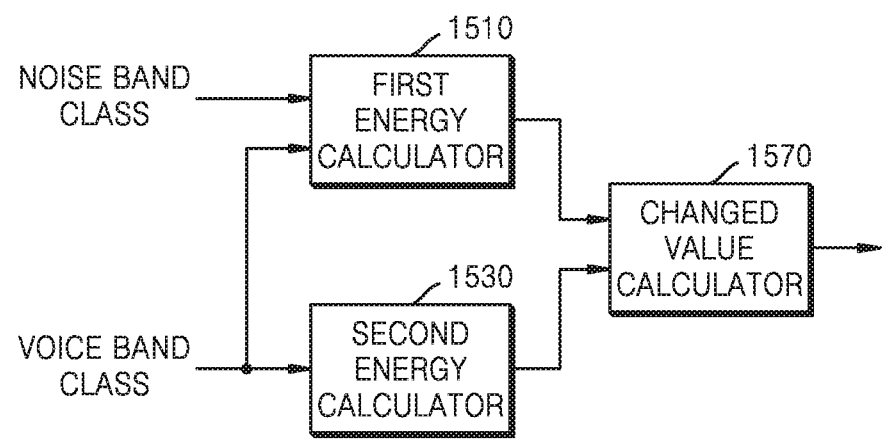
FIG. 15 is a detailed block diagram of a guide information generator shown in FIG. 12, according to an embodiment.

FIG. 15 is a detailed block diagram of the guide information generator 1230 shown in FIG. 12, according to an embodiment.

The guide information generator 1230 shown in FIG. 15 may include a first energy calculator 1510, a second energy calculator 1530, and a changed value calculator 1570.

Referring to FIG. 15, the first energy calculator 1510 may calculate boosting energy by comparing total energy of a voice to total energy of noise. In this case, the total energy of the voice and the total energy of the noise may be calculated using an active band of each of the voice and the noise. The boosting energy may be determined by considering a level at which the voice can mask the noise. Similarly, the boosting energy may be determined by considering a level at which the noise can mask the voice. To this end, a tone masking noise ratio (TMNR) or noise masking tone ratio (NMTR) calculated by assuming the voice as a psychoacoustic tone signal may be used. The total energy of the voice may be calculated from a band set to an active class by the first band class determiner 1610. The total energy of the noise may be calculated from a band set to an active class by the second band class determiner 1630. Each total energy may be represented by a dB scale.

For example, the boosting energy may be represented by Equation 1.

$$\tilde{E}_{Boost,dB}(k) = \min(\tilde{E}_{N,dB}(k) + TMN_{dB}(k) - \tilde{E}_{T,dB}(k), \text{Lim}_{dB}(k)) \quad (1)$$

The parameters used in Equation 1 may be represented by Equations 2 to 6.

$$TMN_{dB}(k) = 36 \cdot \frac{1}{B}\sum_b 1 \text{ for } E_{N,dB}(b) > Min_{th,N,dB}(b) \text{ and } b > k \quad (2)$$

$$= 36 \cdot \frac{1}{B}\sum_b 0 \text{ for otherwise}$$

$$Lim_{dB}(k) = 48 \cdot \frac{1}{B}\sum_b 1 \text{ for } E_{T,dB}(b) > Min_{th,T,dB}(b) \text{ and } b > k \quad (3)$$

$$= 48 \cdot \frac{1}{B}\sum_b 0 \text{ for otherwise}$$

$$\tilde{E}_{T,dB}(k) = \sum_{b \in Band_{iT}(k)} E_{T,dB}(k) \quad (4)$$

$$\tilde{E}_{N,dB}(k) = \sum_{b \in Band_{iN}(k)} E_{N,dB}(k)$$

$$Band_{iT}(k) \in \{b | b > k \text{ and } E_{T,dB}(k) > M_{th,T,dB}(k)\} \quad (5)$$

$$Band_{iN}(k) \in \{b | b > k \text{ and } E_{N,dB}(k) > M_{th,N,dB}(k)\} \quad (6)$$

Herein, $\tilde{E}_{N,dB}(k)$ denotes total energy of noise, $\tilde{E}_{T,dB}(k)$ denotes total energy of a voice, $M_{th,N,dB}$ denotes a masking threshold of the noise, and $M_{th,T,dB}$ denotes a masking threshold of the voice. In addition, b denotes a band index, k denotes an index indicating a last donation band, $Band_{iT}(k)$ denotes band information belonging to an active band of a voice signal when the last donation band is k, $Band_{iN}(k)$ denotes band information belonging to an active band of a noise signal when the last donation band is k, B denotes the total number of bands of a frame, $TMN_{dB}(k)$ denotes a ratio of the active band in the noise signal, and $Lim_{dB}(k)$ denotes a ratio of the active band in the voice signal. This indicates that spectrum dynamics of each of the voice signal and the noise signal is considered.

The second energy calculator 1530 may determine donating energy based on a donation band. In this case, donating energy of the same value may be allocated to each donation band. For example, the donating energy may be represented by Equation 7.

$$\tilde{E}_{Donate,dB}(b) = D_{dB} \quad (7)$$

In Equation 2, $D_{dB}$ may be represented by Equation 8.

$$D_{dB} = \frac{\tilde{E}_{N,dB}(0) - TMN_{dB}(0) - \tilde{E}_{T,dB}(0)}{18} \quad (8)$$

Herein, $\tilde{E}_{N,dB}(0)$ denotes total active band energy in the noise signal, and $\tilde{E}_{T,dB}(0)$ denotes total active band energy in the voice signal.

The changed value calculator 1550 may smooth boosting energy of a current band by using smoothed boosting energy of a previous band, to prevent sound quality deterioration. In this case, donating energy of the current band may not be smoothed.

For example, smoothing of boosting energy of a band other than a donation band and donating energy of the donation band may be represented by Equation 9.

$$\tilde{E}_{sm,dB}(b) = \frac{\tilde{E}_{sm,dB}(b-1) + \tilde{E}_{Boost,dB}(b)}{2} \quad (9)$$

for $b > k$ and $b \in$ boosting bands $$\tilde{E}_{sm,dB}(b) = \tilde{E}_{Donate,dB}(b) \text{ for } b \leq k$$

Herein, a boosting band indicates an active band.

The changed value calculator 1550 may calculate total boosting energy and total donating energy of a frame by transforming the smoothed boosting energy and donating energy from a dB scale to a linear scale and calculate a band-specific changed value by considering an energy increase/decrease portion.

For example, the band-specific changed value, e.g., a gain Gain(b) may be represented by Equation 10.

$$\text{Gain}(b) = \sqrt{1 + \frac{E_{T,lin}(b) * \sqrt{10^{0.1*\tilde{E}_{sm,dB}(b)}}}{E_{T,lin}(b)}} - E_{T,lin}(b) \quad (10)$$

Herein, $E_{T,lin}(b)$ denotes linear-scale voice energy of a band (b).

According to Equation 4, a value of the smoothed boosting energy or donating energy transformed to the linear scale is added to voice energy, and then, the gain Gain(b) may be calculated based on a difference from original voice energy.

The changed value calculator 1550 may determine the allowable number of donation bands at a point where total boosting energy is less than total donating energy in a frame while increasing the number of donation bands.

This may be represented by Equation 11.

$$\tilde{E}_{Donate,tot,lin}(k) \geq \tilde{E}_{Boost,tot,lin}(k) \quad (11)$$

$$\tilde{E}_{Boost,tot,lin}(k) = \sum_{b \in Band_{iT}(k)} \left( E_{T,lin}(b) * \sqrt{10^{0.1*\tilde{E}_{sm,dB}(b)}} - E_{T,lin}(b) \right)$$

$$\tilde{E}_{Donate,tot,lin}(k) = \sum_{b=0} E_{T,lin}(b) * \sqrt{10^{0.1*\tilde{E}_{donate,dB}(b)}} - E_{T,lin}(b)$$

$$Band_{iT}(k) \in \{b \mid b > k \text{ and } E_{T,dB}(b) > M_{th,T,dB}(b)\}$$

That is, a value of k at a point where total boosting energy $\tilde{E}_{Boost,tot,lin}(k)$ is less than total donating energy $\tilde{E}_{Donate,tot,lin}(k)$ corresponds to the allowable number of donation bands. Herein, b denotes a band index and k denotes an index indicating a last donation band. $Band_{iT}(k)$ denotes band information belonging to an active band of a voice signal when the last donation band is k, and Equation 5 may be calculated while increasing a donation band from a low frequency to a high frequency one-by-one.

The changed value calculator 1550 may correct a donation band based on total boosting energy and total donating energy, correct an active band and an in-active band according to the corrected donation band, and calculate the band-specific changed value Gain(b) with respect to the corrected donation band and active band. Accordingly, with respect to the in-active band, an original signal may be maintained.

Figure 16:
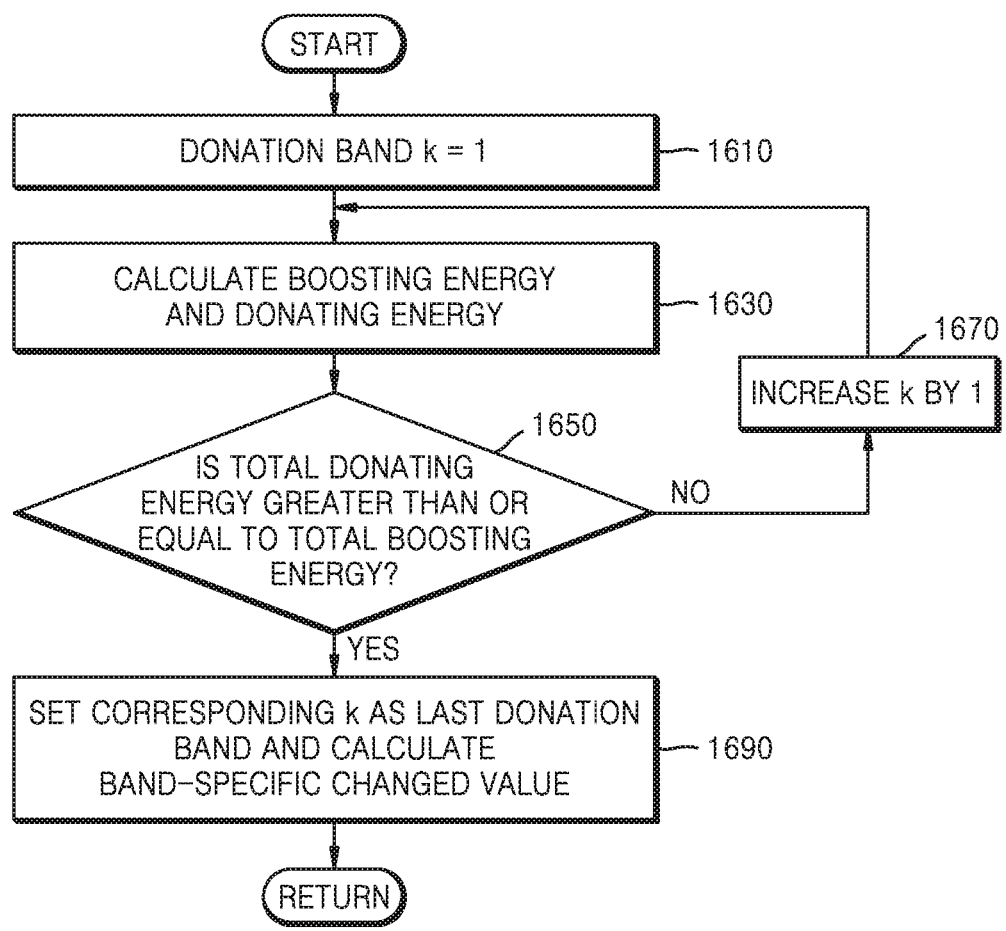
FIG. 16 illustrates an operation of the guide information generator shown in FIG. 12.

FIG. 16 illustrates an operation of the guide information generator 1230 shown in FIG. 12.

Referring to FIG. 16, in operation 1610, a donation band index k is set to 1.

In operation 1630, boosting energy and donating energy are calculated using the first energy calculator 1510 and the second energy calculator 1530 in FIG. 15.

In operation 1650, total boosting energy and total donating energy are compared using the changed value calculator 1550 in FIG. 15.

In operation 1670, when the total donating energy is less than the total boosting energy as a result of the comparison in operation 1650, the donation band index is increased by 1, and the guide information generator 1230 proceeds back to operation 1630.

In operation 1690, when the total donating energy is greater than or equal to the total boosting energy as the result of the comparison in operation 1650, the donation band index k satisfying a corresponding condition is determined as the allowable number of donation bands in a frame and a band-specific changed value is calculated by considering an energy increase/decrease portion based on the allowable number of donation bands.

Figure 17:
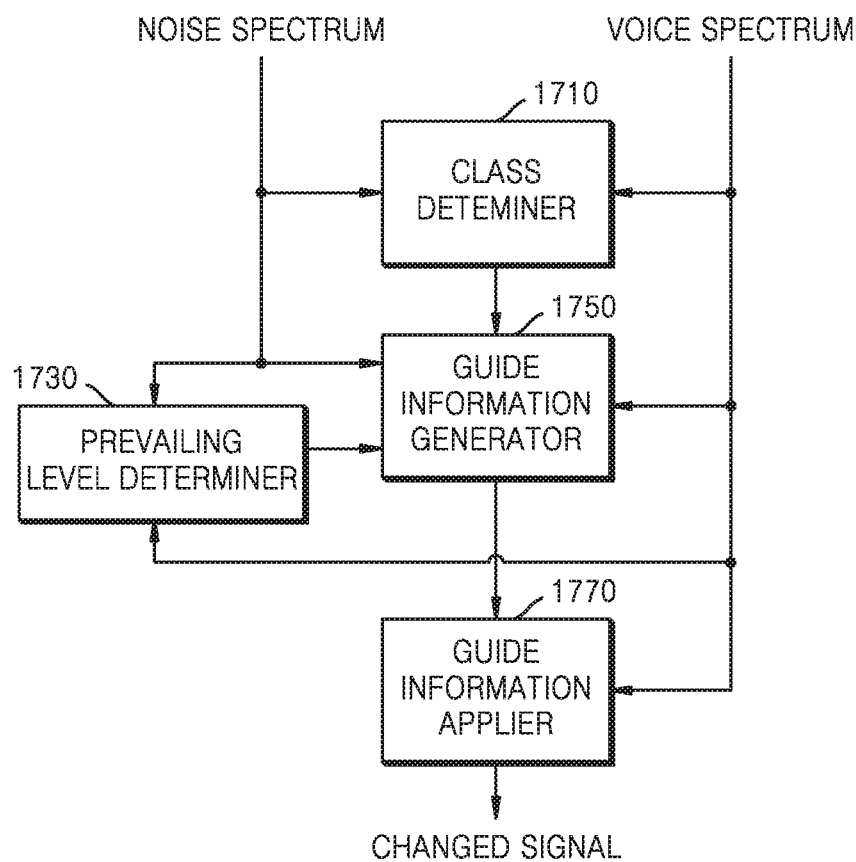
FIG. 17 is a detailed block diagram of a signal processing apparatus according to another embodiment.

FIG. 17 is a detailed block diagram of a signal processing apparatus according to another embodiment and may correspond to the first intelligibility enhancer 630 of FIG. 6 or the intelligibility enhancer 730 of FIG. 7.

The signal processing apparatus shown in FIG. 17 may include a class determiner 1710, a prevailing level determiner 1730, a guide information generator 1750, and a guide information applier 1770. The components may be integrated into at least one processor. Although not shown, a memory configured to store an input/output signal may be further included at a front end or rear end of each component. Herein, the prevailing level determiner 1730 may be optionally used, and in this case, the prevailing level determiner 1730 may not be considered when distortion D to be used in a voice intelligibility model is calculated.

Referring to FIG. 17, the class determiner 1710 may determine a class for each spectrum of a transmitted voice signal. According to an embodiment, a class may be determined in frequency bin units. To this end, a voice signal and a noise signal are transformed to a frequency domain, and a voice spectrum and a noise spectrum obtained as a result of the transformation may be provided to the class determiner 1710. A transformation scheme may include discrete Fourier transform (DFT), Fast Fourier transform (FFT), or modified discrete cosine transform (MDCT)+modified discrete sine transform (MDST) but is not limited thereto. The class determiner 1710 may perform comparison with a voice masking threshold in frequency bin units, and when a magnitude of a frequency bin is less than the voice masking threshold, a corresponding frequency bin may be set to class B to maintain the corresponding frequency bin without change. That is, even an inaudible voice is maintained as it is. The class determiner 1710 may compare noise energy with a comfort noise level in frequency bin units, and when the noise energy is less than the comfort noise level, a corresponding frequency bin may be set to class B to maintain the corresponding frequency bin without change. That is, when a noise level is low, a corresponding frequency bin is maintained as it is. When voice energy E1 is greater than noise energy E2 in a frequency bin unit, for example, when E2*64<E1, a corresponding frequency bin may be set to class C to change the corresponding frequency bin such that a magnitude of the corresponding frequency bin is decreased. Frequency bins, which do not correspond to classes B and C, may be set to class A to change the frequency bins such that magnitudes of the frequency bins are increased or decreased. For a frequency bin set to class A, when the frequency bin is less than a frequency threshold Th set by a specific frequency bin, the frequency bin may be changed such that a magnitude thereof is decreased; otherwise, when the frequency bin is greater than or equal to the frequency threshold Th set by the specific frequency bin, the frequency bin may be changed such that the magnitude thereof is increased. In this case, the voice masking threshold may be determined by considering an absolute threshold of a voice signal. The frequency threshold Th may be determined by considering characteristics of a speaker, and a too low frequency signal may be excluded.

The prevailing level determiner 1730 may obtain an SNR or an effective noise level from the noise spectrum and determine a prevailing level based on the SNR or the effective noise level. The higher the SNR or the effective noise level, the greater a value of the prevailing level, and the greater the prevailing level, the greater a degree of a change in the voice signal. That is, the greater the prevailing level, the greater an energy increase of the voice signal. The effective noise level may be greater than a magnitude of actual noise by reflecting a psychoacoustic principle instead of reflecting the magnitude of the actual noise existing in the noise spectrum as it is. The prevailing level determiner 1730 may include a table in which SNRs or effective noise levels are mapped to prevailing levels.

The guide information generator 1750 may calculate a spectrum-specific changed value by receiving the voice spectrum, the noise spectrum, spectrum class information, and the prevailing level and generate the spectrum-specific changed value as guide information. The guide information generator 1750 may calculate the spectrum-specific changed value based on a voice intelligibility (VI) model. A general VI model may be defined as an algorithm of generating guide information to be used to generate Sp' which minimizes a difference between a voice signal Sp and a voice signal Sp'+N to which the guide information is reflected in a noise-receiving environment. Distortion D may be defined as $[Sp-(Sp'+N)]^2$, and constraints S may be defined to maintain total energy of a frame. In more detail, the VI model may be modeled to generate guide information Gain which minimizes a difference, i.e., the distortion D, between a received voice signal S and a voice signal S*Gain to which a noise signal Noise and the guide information Gain to be generated are reflected, by considering the determined class.

For an optimization problem, L=D+λS is represented through a Lagrange multiplier, and α and ρ, which minimize D, may be determined. In this case, α and β, which minimize D, may be determined by using the frequency threshold Th while moving the frequency threshold Th from 0 to a specific frequency, e.g., the last frequency bin. The guide information generator 1750 may use the general VI model in which inter-spectrum importance is not considered or a weighted VI model in which inter-spectrum importance is considered.

Hereinafter, a method of obtaining a spectrum-specific changed value by using the general VI model will be described in more detail.

First, D may be defined by Equation 12 based on a class of a frequency bin.

$$D = \Sigma_i(X_i-(\alpha X_i-\gamma Y_i))(X_i-(\alpha X_i^*+\gamma Y_i^*))+\Sigma_j(X_j-(\beta X_j+\gamma Y_j))(X_j^*-(\beta X_j^*+\gamma Y_j^*))+\Sigma_k(X_k-(X_k+\gamma Y_k))(X_k^*-(X_k^*+\gamma Y_k^*)) \quad (12)$$

Herein, a denotes a gain of a frequency bin less than the frequency threshold Th among frequency bins classified to class C and frequency bins classified to class A, e.g., a frequency bin of 0 to Th−1 instead of k, β denotes a gain of a frequency bin greater than or equal to the frequency threshold Th among the frequency bins classified to class A, e.g., a frequency bin of Th to N−1 instead of k, γ denotes a prevailing level of a transmitted voice signal X to a noise signal Y of a microphone, and k denotes an inaudible frequency bin. When the prevailing level is not considered, γ may be set to 1.

In Equation 12, $\Sigma_i(X_i-(\alpha X_i+\gamma Y_i))(X_i^*-(\alpha X_i^*+\gamma Y_i^*))$ is a term of frequency bins less than the frequency threshold Th among the frequency bins classified to class C and the frequency bins classified to class A, and corresponding frequency bins are related to a indicating energy decrease, $\Sigma_j(X_j-(\beta X_j+\gamma Y_j))(X_j^*-(\beta X_j^*+\gamma Y_j^*))$ is a term of frequency bins greater than or equal to the frequency threshold Th among the frequency bins classified to class A, and corresponding frequency bins are related to β indicating energy increase, and $\Sigma_k(X_k-(X_k+\gamma Y_k))(X_k-(X_k+\gamma Y_k^*))$ is a term of frequency bins classified to class B, and corresponding frequency bins are maintained without energy increase or decrease.

D in Equation 12 may be simplified by Equation 13.

(13)

$$\begin{aligned}D &= \sum_i (X_i X_i^* - \alpha X_i X_i^* - \gamma Y_i X_i^* - \alpha X_i X_i^* - \\ &\quad \gamma X_i Y_i^* + \alpha^2 X_i X_i^* + \alpha\gamma Y_i X_i^* + \alpha\gamma X_i Y_i^* + \gamma^2 Y_i Y_i^*) + \\ &\quad \sum_j (X_j X_j^* - \beta X_j X_j^* - \gamma Y_j X_j^* - \beta X_j X_j^* - \gamma X_j Y_j^* + \beta^2 X_j X_j^* + \\ &\quad \beta\gamma Y_j X_j^* + \beta\gamma X_j Y_j^* + \gamma^2 Y_j Y_j^*) + \gamma^2 \sum_k Y_k Y_k^* \\ &= \sum_i X_i X_i^* - 2\alpha \sum_i X_i X_i^* - 2\gamma R\Big(\sum_i X_i Y_i^*\Big) + \alpha^2 \sum_i X_i X_i^* + \\ &\quad 2\alpha\gamma R\Big(\sum_i X_i Y_i^*\Big) + \gamma^2 \sum_i Y_i Y_i^* + \sum_j X_j X_j^* - \\ &\quad 2\beta \sum_j X_j X_j^* - 2\gamma R\Big(\sum_j X_j Y_j^*\Big) + \beta^2 \sum_j X_j X_j^* + \\ &\quad 2\beta\gamma R\Big(\sum_j X_j Y_j^*\Big) + \gamma^2 \sum_j Y_j Y_j^* + \gamma^2 \sum_k Y_k Y_k^* \\ &= (\alpha^2 - 2\alpha + 1)\sum_i X_i X_i^* + 2\gamma R\Big(\sum_i X_i Y_i^*\Big)(\alpha - 1) + \\ &\quad (\beta^2 - 2\beta + 1)\sum_j X_j X_j^* + 2\gamma R\Big(\sum_j X_j Y_j^*\Big)(\beta - 1) + \gamma^2 \sum YY\end{aligned}$$

In summary, the optimization problem may be formalized by Equation 14

$$\begin{aligned}D &= (\alpha^2 - 2\alpha + 1)\sum_i X_i X_i^* + 2\gamma R\Big(\sum_i X_i Y_i^*\Big)(\alpha - 1) + \\ &\quad (\beta^2 - 2\beta + 1)\sum_j X_j X_j^* + 2\gamma R\Big(\sum_j X_j Y_j^*\Big)(\beta - 1) + \gamma^2 \sum YY \\ S &= \alpha^2 \sum_i X_i X_i^* + \beta^2 \sum_j X_j X_j^* + \sum_k X_k X_k^* - \sum XX^* - E \\ L &= D + \lambda S\end{aligned} \quad (14)$$

Herein, E denotes energy to be increased or decreased in a frame.

Through a series of processes, a solution may be obtained based on Equation 15.

$$\frac{\partial L}{\partial \lambda} = \alpha^2 \sum_i X_i X_i^* + \beta^2 \sum_j X_j X_j^* + \sum_k X_k X_k^* - \sum XX^* - E = 0 \quad (15)$$

$$\frac{\partial L}{\partial \alpha} = (2a - 2)\sum_i X_i X_i^* + 2\gamma R\Big(\sum_i X_i Y_i^*\Big) + 2\alpha\lambda \sum_i X_i X_i^* = 0$$

-continued $$\frac{\partial L}{\partial \beta} = (2\beta - 2)\sum_j X_j X_j^* + 2\gamma R\left(\sum_j X_j Y_j^*\right) + 2\beta\lambda\sum_j X_j X_j^* = 0$$

In detail, Equation 15 may be represented by Equation 16 according to energy conservation constraints.

$$\frac{\partial L}{\partial \lambda} = \alpha^2 \sum_i X_i X_i^* + \beta^2 \sum_j X_j X_j^* + \sum_k X_k X_k^* - \sum XX^* - E = 0 \quad (16)$$

$$\alpha^2 = \frac{\sum XX^* + E - \sum_k X_k X_k^* - \beta^2 \sum_j X_j X_j^*}{\sum_i X_i X_i^*}$$

$$\beta^2 = \frac{\Sigma XX^* + E - \sum_k X_k X_k^* - \alpha^2 \Sigma_i X_i X_i^*}{\sum_j X_j X_j^*}$$

Next, α and β may be represented by Equation 17 according to an optimal gain.

$$\frac{\partial L}{\partial \alpha} = (2\alpha - 2)\sum_i X_i X_i^* + 2\gamma R\left(\sum_i X_i Y_i^*\right) + 2\alpha\lambda\sum_i X_i X_i^* = 0 \quad (17)$$

$$\frac{\partial L}{\partial \beta} = (2\beta - 2)\sum_j X_j X_j^* + 2\gamma R\left(\sum_j X_j Y_j^*\right) + 2\beta\lambda\sum_j X_j X_j^* = 0$$

$$a = \frac{\sum_i X_i X_i^* - \gamma R\left(\sum_i X_i Y_i^*\right)}{(1+\lambda)\sum_i X_i X_i^*}$$

$$\beta = \frac{\sum_j X_j X_j^* - \gamma R\left(\sum_j X_j Y_j^*\right)}{(1+\lambda)\sum_j X_j X_j^*}$$

Next, Equation 18 may be used to determine a parameter λ.

$$\sigma = \frac{\sum_i X_i X_i^* - \gamma R\left(\sum_i X_i Y_i\right)}{(1+\lambda)\sum_i X_i X_i^*} \beta = \frac{\sum_j X_j X_j^* - \gamma R\left(\sum_j X_j Y_j^*\right)}{(1+\lambda)\sum_j X_j X_j^*} \quad (18)$$

$$a^2 \sum_i X_i X_i^* + \beta^2 \sum_j X_j X_j^* + \sum_k X_k X_k = \sum XX^* + E$$

$$\frac{1}{1+\lambda} = \sqrt{\frac{\sum XX^* + E - \sum_k X_k X_k^*}{\frac{\left(\sum_i X_i X_i^* - \gamma R\left(\sum_i X_i X_i^*\right)\right)^2}{\sum_i X_i X_i^*} + \frac{\left(\sum_j X_j X_j^* - \gamma R\left(\sum_j X_j X_j^*\right)\right)^2}{\sum_j X_j X_j^*}}}$$

α and β may be obtained by substituting A obtained by Equation 18 into Equation 11.

Final α and β may be determined by Equations 12 to 18, and as a result, the frequency threshold Th, which minimizes D, may be obtained. The frequency threshold Th may be delimited to a range greater than or equal to 1 KHz and less than Nyq_frq/4. Herein, Nyq_frq denotes a Nyquist frequency. Alternatively, the frequency threshold Th may be delimited to another range in response to a sampling rate.

As described above, according to adjustment of the frequency threshold Th from an initial value by a predetermined unit, α and β may also be adjusted, and the frequency threshold Th, which minimizes D, may be determined while repeating a process of calculating D from adjusted a and p. In response to the determined frequency threshold Th, α and β are determined, wherein finally determined a indicates a changed value for frequency bins determined as class C, i.e., energy decrease, and frequency bins determined as energy decrease among the frequency bins determined as class A, and p indicates a changed value for frequency bins determined as energy increase among the frequency bins determined as class A.

Next, a method of obtaining a spectrum-specific changed value by using the weighted VI model will be described in more detail.

First, D may be defined by Equation 19 based on a class of a frequency bin.

$$D = \Sigma_i W_i(X_i - (\alpha X_i + \gamma Y_i))(X_i - (\alpha X_i + \gamma Y_i))^* + \Sigma_j W_j(X_j - (\beta X_j + \gamma Y_j))(X_j - (\beta X_j^* + \gamma Y_j^*)) + \Sigma_k W_k(X_k - (X_k + \gamma Y_k))(X_k^* - (X_k^* + \gamma Y_k^*)) \quad (19)$$

Equation 19 differs from Equation 12 in that a weight W is used. The weight W may be obtained based on spectral importance. The importance may be relative or absolute importance. The relative importance may be obtained by using a previous spectrum based on unpredictability used in a psychoacoustic model.

D of Equation 19 may be simplified by Equation 20.

$$D = \Sigma_i W_i(X_i X_i^* - \alpha X_i X_i^* - \gamma Y_i X_i^* - \alpha X_i X_i^* - \gamma X_i Y_i^* + \alpha^2 X_i X_i^* + \alpha\gamma Y_i X_i^* + \alpha\gamma X_i Y_i^* + \gamma^2 Y_i Y_i^*) + \Sigma_j W_j(X_j X_j^* - \beta X_j X_j^* - \gamma Y_j X_j^* - \beta X_j X_j^* - \gamma X_j Y_j^* + \beta^2 X_j X_j^* + \beta\gamma Y_j X_j^* + \beta\gamma X_j Y_j^* + \gamma^2 Y_j Y_j^*) + \gamma^2 \Sigma_k W_k Y_k Y_k^*$$

$$= \Sigma_i W_i X_i X_i^* - 2\alpha\Sigma_i W_i X_i X_i^* - 2\gamma R(\Sigma_i W_i X_i Y_i^*) + \alpha^2 \Sigma_i W_i X_i X_i^* + 2\alpha\gamma R(\Sigma_i W_i X_i Y_i^*) + \gamma^2 \Sigma_k W_k Y_i Y_i^* + \Sigma_j W_j X_j X_j^* - 2\beta\Sigma_j W_j X_j X_j^* - 2\gamma R(\Sigma_j W_j X_j Y_j^*) + \beta^2 \Sigma_j W_j X_j X_j^* + 2\beta\gamma R(\Sigma_j W_j X_j Y_j^*) + \gamma^2 \Sigma_j W_j Y_j Y_j^* + \gamma^2 \Sigma_k W_k Y_k^*$$

$$= (\alpha^2 - 2\alpha + 1)\Sigma_i W_i X_i X_i^* + 2\gamma R(\Sigma_i W_i X_i Y_i^*)(\alpha - 1) + (\beta^2 - 2\beta + 1)\Sigma_j W_j X_j X_j^* + 2\gamma R(\Sigma_j W_j X_j Y_j^*)(\beta - 1) + \gamma^2 \Sigma WYY^* \quad (20)$$

In summary, the optimization problem may be formalized by Equation 21.

$$D = (\alpha^2 - 2\alpha + 1)\Sigma_i W_i X_i X_i^* + 2\gamma R(\Sigma_i W_i X_i Y_i^*)(\alpha - 1) + (\beta^2 - 2\beta + 1)\Sigma_j W_j X_j X_j^* + 2\gamma R(\Sigma_j W_j X_j Y_j^*)(\beta - 1) + \gamma^2 \Sigma WYY$$

$$S = \alpha^2 \Sigma_i X_i X_i^* + \beta^2 \Sigma_j X_j X_j^* + \Sigma_k X_k X_k^* - (\Sigma XX^* + E)$$

$$L = D + \lambda S \quad (21)$$

Through a series of processes, a solution may be obtained based on Equation 22.

$$\frac{\partial L}{\partial \lambda} = a^2 \sum_i X_i X_i^* + \beta^2 \sum_j X_j X_j^* + \sum_k X_k X_k^* - \sum XX^* - E = 0 \quad (22)$$

$$\frac{\partial L}{\partial \alpha} = (2\alpha - 2)\sum_i W_i X_i X_i^* + 2\gamma R\left(\sum_i W_i X_i Y_i^*\right) + 2\alpha\lambda\sum_i X_i X_i^* = 0$$

$$\frac{\partial L}{\partial \beta} = (2\beta - 2)\sum_j W_j X_j X_j^* + 2\gamma R\left(\sum_j W_j X_j Y_j^*\right) + 2\beta\lambda\sum_j X_j X_j^* = 0$$

In detail, Equation 22 may be represented by Equation 23 according to energy conservation constraints.

$$\frac{\partial L}{\partial \lambda} = \alpha^2 \sum_i X_i X_i^* + \beta^2 \sum_j X_j X_j^* + \sum_k X_k X_k^* - \sum XX^* - E = 0 \quad (23)$$

$$\alpha^2 = \frac{\sum XX^* + E - \sum_k X_k X_k^* - \beta^2 \sum_j X_j X_j^*}{\sum_i X_i X_i^*}$$

$$\beta^2 = \frac{\sum XX^* + E - \sum_k X_k X_k^* - \alpha^2 \sum_i X_i X_i^*}{\sum_j X_j X_j^*}$$

Next, α and β may be represented by Equation 24 according to an optimal gain.

$$\frac{\partial L}{\partial \alpha} = (2\alpha - 2) \sum_i W_i X_i X_i^* + 2\gamma R\left(\sum_i W_i X_i Y_i^*\right) + 2a\lambda \sum_i X_i X_i^* = 0 \quad (24)$$

$$\frac{\partial L}{\partial \beta} = (2\beta - 2) \sum_j W_j X_j X_j^* + 2\gamma R\left(\sum_j W_j X_j Y_j^*\right) + 2\beta\lambda \sum_j X_j X_j^* = 0$$

$$\alpha = \frac{\sum_i W_i X_i X_i^* - \gamma R\left(\sum_i W_i X_i Y_i^*\right)}{\lambda \sum_i X_i X_i^* + \sum_i W_i X_i X_i^*}$$

$$\beta = \frac{\sum_j W_j X_i X_j^* - \gamma R\left(\sum_j W_j X_j Y_j^*\right)}{\lambda \sum_j X_j X_j^r + \sum_j W_j X_j X_j^*}$$

Next, Equation 25 may be used to determine a parameter λ.

$$\alpha^2 \sum_i X_i X_i^* + \beta^2 \sum_j X_j X_j^* + \sum_k X_k X_k^* = \quad (25)$$

$$\sum XX^* + E \frac{\left(\sum_i W_i X_i X_i^* - \gamma R\left(\sum_i W_i X_i Y_i^*\right)\right)^2 \sum_i X_i X_i^*}{\left(\lambda \sum_i X_i X_i^* + \sum_i W_i X_i X_i^*\right)^2} +$$

$$\frac{\left(\sum_j W_j X_j X_j^* - \gamma R\left(\sum_j W_j X_j Y_j^*\right)\right)^2 \sum_j X_j X_j^*}{\left(\lambda \sum_j X_j X_j^* + \sum_j W_j X_j X_j^*\right)^2} =$$

$$\sum XX^* + E - \sum_k X_k X_k^*$$

No logical solution of Equation 25 exists, and thus, Equation 21 may be formalized to Equation 26 by inserting a weight into constraints S.

$$D = (\alpha^2 - 2\alpha + 1)\Sigma_i W_i X_i X_i^* + 2\gamma R(\Sigma_i W_i X_i Y_i^*)(\alpha - 1) + (\beta^2 - 2\beta + 1)\Sigma_j W_j X_j X_j^* + 2\gamma R(\Sigma_j W_j X_j Y_j^*)(\beta - 1) + \gamma^2 WYY$$

$$S = \alpha^2 \Sigma_i W_i X_i X_i^* + \beta^2 \Sigma_j W_j X_j X_j^* + \Sigma W_k X_k X_k^* - (\Sigma WXX^* + E)$$

$$L = D + \lambda S \quad (26)$$

Through a series of processes, a solution may be obtained by Equation 27.

$$\frac{\left(\sum_i W_i X_i X_i^* - \gamma R\left(\sum_i W_i X_i Y_i^*\right)\right)^2 \sum_i W_i X_i X_i^*}{\left(\lambda \sum_i W_i X_i X_i^* + \sum_i W_i X_i X_i^*\right)^2} + \quad (27)$$

$$\frac{\left(\sum_j W_j X_j X_j^* - \gamma R\left(\sum_j W_j X_j Y_j^*\right)\right)^2 \sum_j W_j X_j X_j^*}{\left(\lambda \sum_j W_j X_j X_j^* + \sum_j W_j X_j X_j^*\right)^2} =$$

$$\sum WXX^* + E - \sum_k W_k X_k X_k^*$$

$$\frac{1}{1+\lambda} = \sqrt{\frac{\sum WXX^* + E - \sum_k W_k X_k X_k^*}{\frac{\left(\sum_i W_i X_i X_i^* - \gamma R\left(\sum_i W_i X_i Y_i^*\right)\right)^2}{\sum_i W_i X_i X_i^*} + \frac{\left(\sum_j W_j X_j X_j^* - \gamma R\left(\sum_j W_j X_j Y_j^*\right)\right)^2}{\sum_j W_j X_j X_j^*}}}$$

As described above, a method of obtaining a solution based on the weighted VI model cannot satisfy the energy conservation constraints since constraints are changed. Therefore, to satisfy the energy conservation constraints, it is needed to change α and β by using Equation 28.

$$g = \sqrt{\frac{\sum_i W_i X_i X_i^* + \sum_j W_j X_j Y_j^* + E}{a^2 \sum_i W_i X_i X_i^* + b^2 \sum_j W_j X_j Y_j^* + E}} \quad (28)$$

$$a = ag; b = bg$$

Final α and β may be determined by Equations 19 to 28, and as a result, the frequency threshold Th, which minimizes D. The frequency threshold Th may have a range greater than or equal to 1 KHz and less than Nyq_frq/4 but is not limited thereto. Herein, Nyq_frq denotes a Nyquist frequency.

The guide information generator 1750 may generate guide information for enhancement of intelligibility based on a VI model-based variable value. The guide information may include an effective frequency bin for which the enhancement of intelligibility is to be performed and a changed value for the effective frequency bin. The effective frequency bin may vary in frame units. In detail, when the frequency threshold Th, which minimizes D, is obtained based on a VI model, α and β may be determined in response to the frequency threshold Th. Herein, finally determined a indicates a spectral changed value for frequency bins determined as class C, i.e., energy decrease, and frequency bins determined as energy decrease among the frequency bins determined as class A, and p indicates a spectral changed value for frequency bins determined as energy increase among the frequency bins determined as class A.

According to another embodiment, the guide information applier 1770 may secure additional energy from an excluded band by limiting a band of which enhancement of intelligibility is to be performed as a meaningful frequency band in a transmitted voice spectrum. The frequency band of which the enhancement of intelligibility is to be performed may be a band including perceptually important information. The additional energy may be used for a VI model to affect gain determination. In this case, by considering an SNR of a voice signal, a small value may be added to the additional energy when the SBR is high, and a large value may be added to the additional energy when the SBR is low. To this end, an energy reservoir scheme similar to bitrate control of an audio codec may be used.

According to another embodiment, the guide information applier 1770 may calculate an effective noise energy ratio by considering a long-term history to prevent a rapid change in a noise signal, multiply the calculated effective noise energy ratio by a magnitude of a noise spectrum obtained from a microphone, and then use the multiplication result.

The guide information applier 1770 may apply the spectrum-specific changed value, e.g., gain, obtained by the guide information generator 1750 to a frequency bin group of which energy is needed to be decreased and a frequency bin group of which energy is needed to be increased. The guide information applier 1770 may additionally apply a frame-specific gain, e.g., a global gain, to each frequency bin to which the spectrum-specific gain has been applied. The frame-specific gain may be set in correspondence with a volume level of a terminal. The guide information applier 1770 may store a table in which volume levels of a terminal are mapped to global gains.

Figure 18:
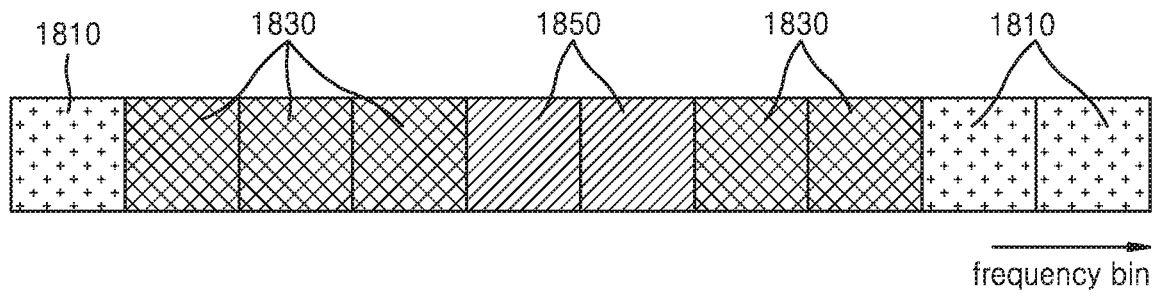
FIG. 18 illustrates a class of a frequency bin.

FIG. 18 illustrates a class of a frequency bin or a spectrum bin, wherein 1810 denotes frequency bins set to class A, 1830 denotes frequency bins set to class B, and 1850 denotes frequency bins set to class C.

Figure 19:
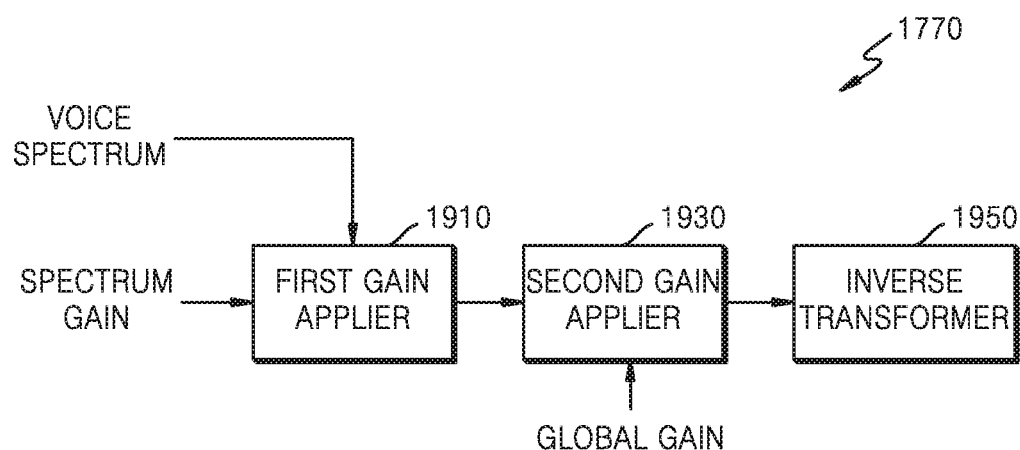
FIG. 19 is a detailed block diagram of a guide information applier shown in FIG. 17, according to an embodiment.

FIG. 19 is a detailed block diagram of the guide information applier 1770 shown in FIG. 17, according to an embodiment, and may also be applied to the guide information applier 1250 of FIG. 12.

The guide information applier 1770 shown in FIG. 19 may include a first gain applier 1910, a second gain applier 1930, and an inverse transformer 1950. Herein, the second gain applier 1930 may be arranged next to the inverse transformer 1950 to apply a global gain to a voice signal transformed to a time domain.

Referring to FIG. 19, the first gain applier 1910 may apply, to a corresponding frequency bin, a local gain determined in a frequency bin unit.

The second gain applier 1930 may apply a global gain set in response to a volume level of a terminal to each frequency bin to which the local gain has been applied.

The inverse transformer 1950 may inverse-transform, to a time domain, a frame including the frequency bins to which the global gain has been applied by the second gain applier 1930. In this case, a spectrum-specific changed value, e.g., gain, may be applied to each frequency bin. The guide information applier 1770 may additionally apply a frame-specific gain, e.g., global gain, to each frequency bin to which the spectrum-specific gain has been applied. The frame-specific gain may be set in response to a volume level of a terminal.

When the guide information applier 1770 of FIG. 19 is applied to the guide information applier 1250 of FIG. 12, the first gain applier 1910 may apply, to a corresponding band, a local gain determined in a band unit.

Figure 20:
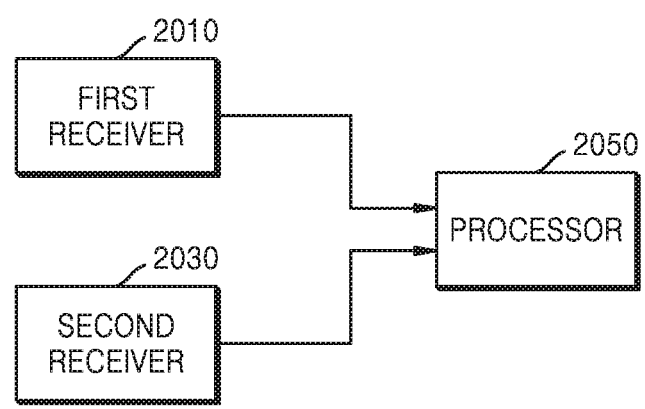
FIG. 20 is a detailed block diagram of a signal processing apparatus according to another embodiment.

FIG. 20 is a detailed block diagram of a signal processing apparatus according to another embodiment.

The signal processing apparatus shown in FIG. 20 may include a first receiver 2010, a second receiver 2030, and a processor 2050.

Referring to FIG. 20, the first receiver 2010 may receive a noise signal of a reception side or a near-end device through a microphone. The second receiver 2030 may receive a voice signal of a counterpart from a transmission side or a far-end device.

According to an embodiment, the processor 2050 may determine a class related to enhancement of intelligibility of the voice signal based on the noise signal provided from the first receiver 2010 and the voice signal from the second receiver 2030, generate guide information for the enhancement of intelligibility based on the noise signal, the voice signal, and the determined class, and generate a changed voice signal by applying the guide information to the voice signal. According to another embodiment, the processor 2050 may determine a band class related to enhancement of intelligibility for each band of the noise signal provided from the first receiver 2010 and the voice signal from the second receiver 2030, generate guide information for the enhancement of intelligibility based on the determined band class of the noise signal and the determined band class of the voice signal, and generate a changed voice signal by applying the guide information to the voice signal.

Figure 21:
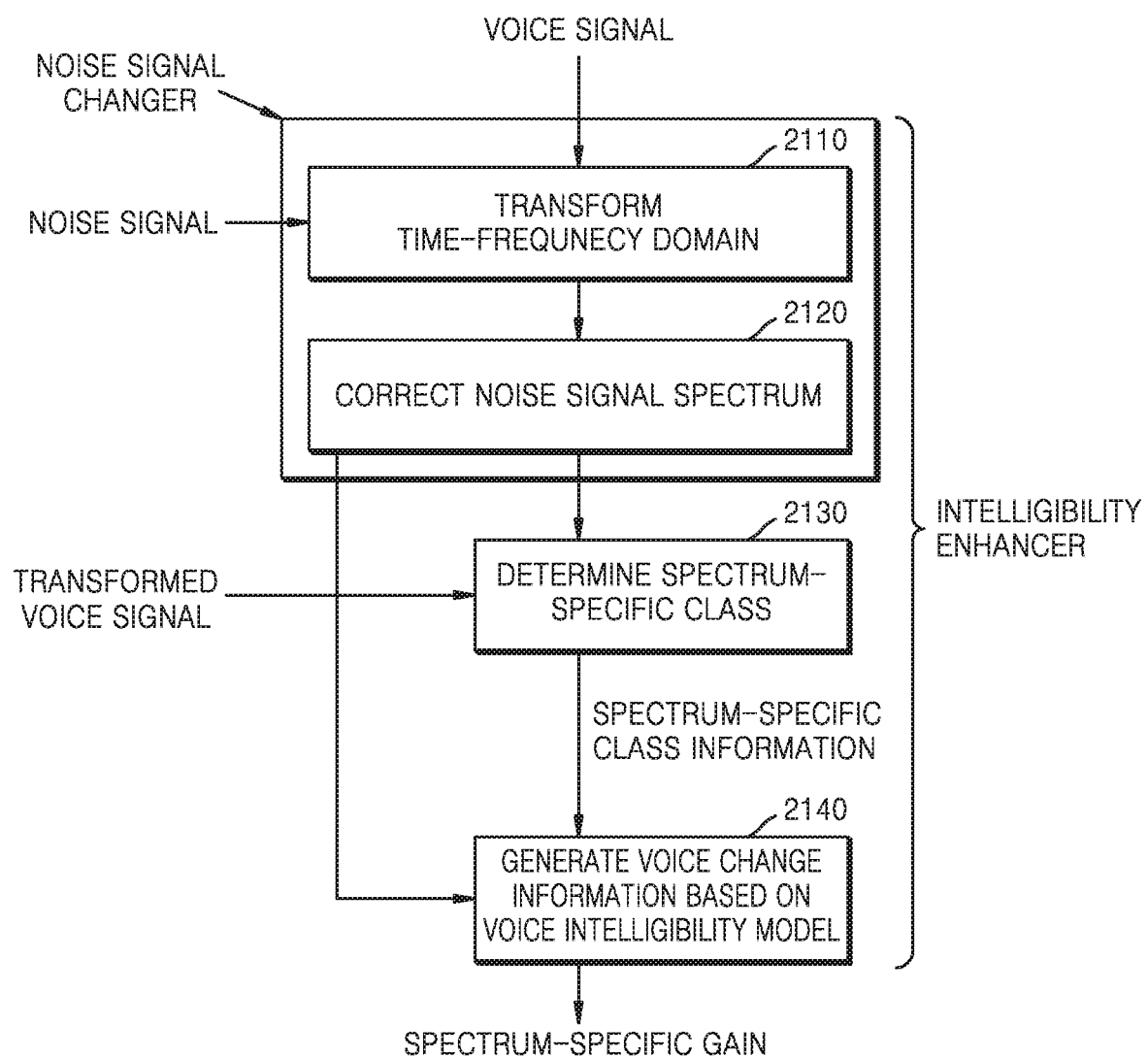
FIG. 21 is a block diagram for describing a method of generating a voice signal of which intelligibility has been enhanced, according to an embodiment.

FIG. 21 is a block diagram for describing a method of generating a voice signal of which intelligibility has been enhanced, according to an embodiment.

A noise reducer (710 of FIG. 7) may reduce or remove noise of a decoded signal or a voice signal of a counterpart, and perform time alignment and framing of each signal so as to match time and frame synchronization with an intelligibility enhancer (730 of FIG. 7).

The intelligibility enhancer (730 of FIG. 7) may additionally perform noise signal change processing. A noise signal changer may change the noise signal by performing time-frequency transformation for the noise signal and an output signal of the noise reducer (710 of FIG. 7) in operation 2110 and correcting a spectrum of the noise signal in the frequency domain based on the output signal of the noise reducer (710 of FIG. 7) in operation 2120. When the intelligibility enhancer (730 of FIG. 7) does not perform the noise signal change processing, the noise signal may be used as it is.

The intelligibility enhancer (730 of FIG. 7) determines a spectrum-specific class of the transformed voice signal based on the changed noise signal in operation 2130, generates voice signal change information based on the spectrum-specific class information of the voice signal in operation 2140, and outputs a spectrum-specific gain.

According to an embodiment, the voice signal may be changed based on a VI model.

Figure 22:
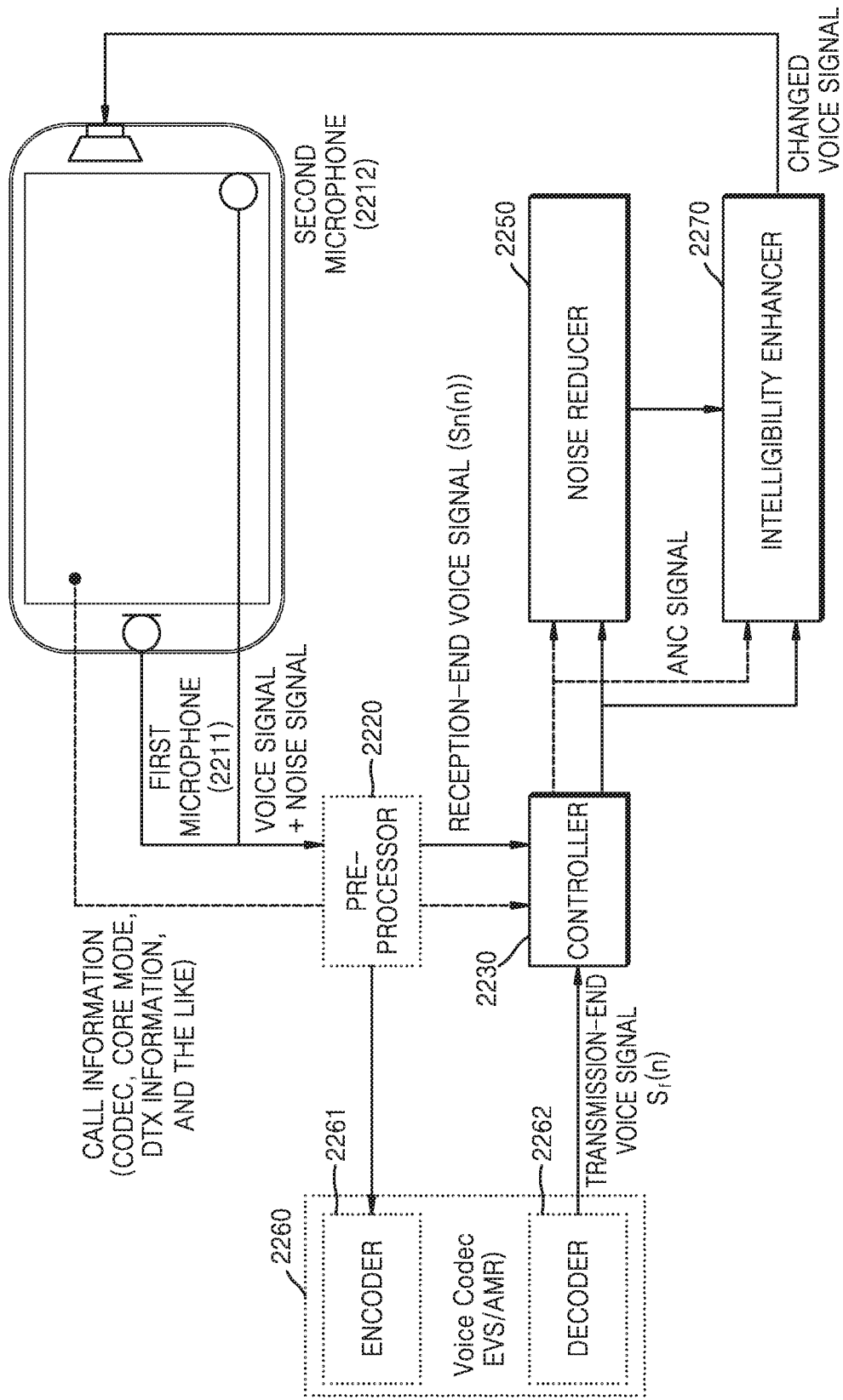
FIG. 22 is a block diagram for describing a method of generating a voice signal of which intelligibility has been enhanced, according to another embodiment.

FIG. 22 is a block diagram for describing a method of generating a voice signal of which intelligibility has been enhanced, according to another embodiment.

Compared with the embodiment of FIG. 21, a reception-end device 2200 according to the embodiment of FIG. 22 further includes a pre-processor 2220 and a codec 2260.

A reception-end voice signal, a reception-end noise signal, a transmission-end voice signal, and information on an incoming call from a transmission-end terminal are delivered to the pre-processor 2220.

In this case, the reception-end voice signal includes a noise-voice signal received through a first microphone 2211 and a noise signal received through a second microphone, and the transmission-end voice signal includes a voice signal delivered from the transmission-end terminal. The information on the incoming call may include a codec type, a core mode of a codec, discontinuous transmission (DTX) information, and the like.

The pre-processor 2220 pre-processes the delivered signals to acquire a voice signal, a noise signal, and an error signal and deliver the acquired voice signal, noise signal, and error signal to a controller 2230 and the codec 2260, and delivers the delivered information on the incoming call to the controller 2230 and the codec 2260. In this case, the pre-processor 2220 may include an echo canceller and the like.

An encoder 2261 of the codec 2260 encodes the reception-end voice signal, and a decoder 2262 thereof decodes the transmission-end voice signal. The codec 2260 delivers a transmission-end voice signal s_f(n) decoded by the decoder to the controller 2230.

The controller 2230 controls operations of a noise reducer 2250 and an intelligibility enhancer 2270 based on the reception-end voice signal, the reception-end noise signal, the transmission-end voice signal, and the call information. The controller 2230 may control an output of the noise reducer 2250 and a power output of the intelligibility enhancer 2270, or control the noise reducer 2250 and the intelligibility enhancer 2270 such that the noise reducer 2250 and the intelligibility enhancer 2270 selectively operate according to a noise type.

In addition, the controller 2230 may determine noise reduction information of the noise reducer 2250 or an intelligibility enhancement degree of the intelligibility enhancer 2270 based on the reception-end voice signal, the reception-end noise signal, the transmission-end voice signal, and the call information.

The noise reducer 2250 may be configured to be the same as the noise reducer of FIG. 7, or various well-known techniques may be applied to the noise reducer 2250.

The intelligibility enhancer 2270 enhances intelligibility by processing the transmission-end voice signal. The intelligibility enhancer 2270 uses a control signal delivered from the controller 2230 and a noise reduction signal delivered from the noise reducer 2250 to enhance the intelligibility of the transmission-end voice signal.

Figure 23:
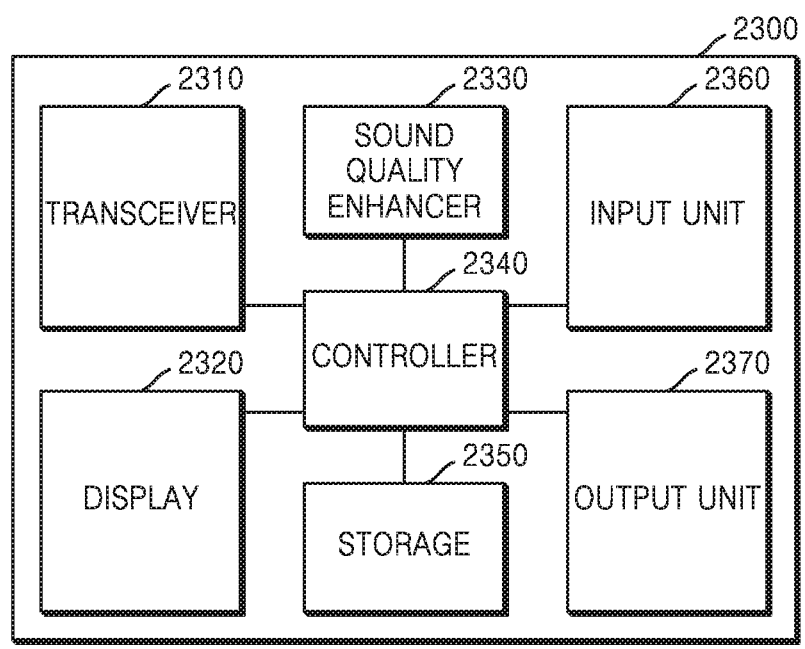
FIG. 23 is a block diagram of a device employing a signal processing apparatus, according to an embodiment.

FIG. 23 is a block diagram of a device employing a signal processing apparatus, according to an embodiment.

As shown in FIG. 23, the signal processing apparatus may be embedded in a sound quality enhancer 2330. A device 2300 may include a transceiver 2310, a display 2320, the sound quality enhancer 2330, a controller 2340, a storage 2350, an input unit 2360, and an output unit 2370.

The transceiver 2310 may transmit and receive data to and from another terminal connected through a network, receive an incoming call signal requested from a transmission-end device (not shown) and a transmission-end voice signal according to an incoming call, and transmit a reception-end voice signal of a reception-end noise signal environment, which has been acquired through the input unit 2360, to the transmission-end device.

According to an embodiment, the transceiver 2310 may transmit information on a reception-end noise signal acquired through the input unit 2360 to a server (150 of FIG. 1) and receive at least one parameter for a sound quality enhancement algorithm from the server 150. According to another embodiment, the transceiver 2310 may receive, from the transmission-end device (not shown), a transmission-end voice signal to which sound quality enhancement pre-processing has been applied.

The display 2320 may provide information on a state or configuration of the device 2300 employing the signal processing apparatus, and the like, to a user and acquire a user input through a means such as a touch. According to an embodiment, the display 2320 may acquire feedback information regarding sound quality enhancement performance from the user. According to another embodiment, the display 2320 may acquire context information regarding a call through a user input.

The sound quality enhancer 2330 acquires at least one parameter for the sound quality enhancement algorithm in a noisy environment based on a voice signal stored in the storage 2350 and the reception-end noise signal acquired through the input unit 2360.

According to an embodiment, the context information regarding the incoming call may be additionally used, and a weight may be determined based on each context information.

In addition, the sound quality enhancer 2330 enhances sound quality of the transmission-end voice signal based on a combination of the at least one parameter for the sound quality enhancement algorithm.

The controller 2340 controls the entire operation of the device 2300. The controller 2340 and the sound quality enhancer 2330 may be implemented by one processor.

The storage 2350 may store the at least one parameter for the sound quality enhancement algorithm.

The input unit 2360 acquires the reception-end noise signal and the reception-end voice signal and may be implemented by a microphone. The number of input units 2360 is not limited, and the input unit 2360 is generally located near the mouth and ears of the user.

The output unit 2370 outputs a sound quality-enhanced transmission-end voice signal and may be implemented by a speaker. According to an embodiment, the output unit 2370 may output an inverse-phase signal of the acquired reception-end noise signal, and in this case, dynamic noise removal is possible.

Some embodiments may be implemented by a recording medium including computer-executable instructions such as a program module executed by a computer system. A computer-readable medium may be an arbitrary available medium which may be accessed by a computer system and includes all types of volatile and nonvolatile media and separated and non-separated media. In addition, the computer-readable medium may include all types of computer storage media and communication media. The computer storage media include all types of volatile and nonvolatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media.

In addition, in the present disclosure, the term such as " . . . unit" or " . . . module", refers to a hardware component such as a processor or a circuit and/or a software component executed by a hardware component such as a processor.

The embodiments described above are only illustrative, and it will be understood by those of ordinary skill in the art to which the embodiments belong that various changes in form and details may be made therein without changing the technical spirit and mandatory features of the present disclosure. Therefore, the embodiments described above should be understood in the illustrative sense only and not for the purpose of limitation in all aspects. For example, each component described as a single type may be carried out by being distributed, and likewise, components described as a distributed type may also be carried out by being coupled.

The scope of the present disclosure is defined by the claims described below rather than the detailed description, and it should be analyzed that the meaning and the scope of the claims and all changes or modified forms derived from their equivalent concept are included in the scope of the present disclosure.

The invention claimed is:

1. A signal processing method comprising:
    determining a class related to enhancement of intelligibility, based on a noise spectrum of a reception side or a near-end device and a received voice spectrum;
    generating guide information for the enhancement of intelligibility based on the noise spectrum, the voice spectrum, and the determined class; and
    generating a changed voice spectrum by applying the guide information to the voice spectrum.

2. The signal processing method of claim 1, wherein the processing in each step is performed in frequency bin units.

3. The signal processing method of claim 1, wherein the determining the class comprises determining, as a class of a frequency bin of the voice spectrum, one of a first class of maintaining the frequency bin as it is, a second class of reducing a magnitude of the frequency bin, and a third class of reducing or increasing the magnitude of the frequency bin.

4. The signal processing method of claim 1, wherein the determining the class comprises:
    setting a first class for a frequency bin in which voice energy of the voice spectrum is less than a voice masking threshold or a frequency bin in which noise energy of the noise spectrum is less than a comfort noise level;
    setting a second class for a frequency bin in which the voice energy of the voice spectrum is relatively greater than the noise energy of the noise spectrum; and
    setting a third class for a frequency bin in which voice energy of the voice spectrum is greater than or equal to the voice masking threshold.

5. The signal processing method of claim 4, wherein the setting the third class comprises setting the third class such that a magnitude of a frequency bin in which the voice energy is less than a predetermined frequency threshold is decreased, and a magnitude of a frequency bin in which the voice energy is greater than or equal to the predetermined frequency threshold is increased.

6. The signal processing method of claim 1, wherein the generating the guide information comprises generating the guide information based on a voice intelligibility model modeled from the noise spectrum, the voice spectrum, a voice spectrum to which the generated guide information has been reflected, and the determined class.

7. The signal processing method of claim 6, wherein the generating the guide information comprises using a voice intelligibility model modeled by considering importance of a frequency bin of the voice spectrum.

8. The signal processing method of claim 6, wherein the voice intelligibility model is modeled by reflecting an effective noise level based on a psychoacoustic characteristic.

9. The signal processing method of claim 1, wherein the generating the guide information comprises generating the guide information including at least one of frequency bin-unit gain information and frame-unit gain information.

10. A non-transitory computer-readable recording medium having recorded thereon a program for executing the signal processing method set forth in claim 1.

11. A terminal device for performing a voice call, the terminal device comprising:
    at least one microphone configured to receive a surrounding environmental signal including a voice signal of a narrator and/or a noise signal; and
    a processor configured to determine a class related to enhancement of intelligibility, based on a noise spectrum of a reception side or a near-end device and a received voice spectrum, generate guide information for the enhancement of intelligibility based on the noise spectrum, the voice spectrum, and the determined class, generate a changed voice spectrum by applying the guide information to the voice spectrum, and provide the changed voice spectrum to a speaker.

12. The terminal device of claim 11, wherein the guide information for the enhancement of intelligibility comprises information on an effective frequency bin and gain information of the effective frequency bin.

13. The terminal device of claim 12, wherein the effective frequency bin varies according to a frame.

14. The terminal device of claim 12, wherein the effective frequency bin comprises a group of which energy is needed to be decreased and a group of which energy is needed to be increased.

15. The terminal device of claim 11, wherein the processor generates the guide information based on a voice intelligibility model modeled from the noise spectrum, the voice spectrum, a voice spectrum to which the generated guide information has been reflected, and the determined class.

* * * * *